(12) United States Patent
Gale et al.

(10) Patent No.: US 12,466,619 B1
(45) Date of Patent: Nov. 11, 2025

(54) CHILD RESISTANT TOPICAL DISPENSER

(71) Applicant: DoseLogix, LLC, Woodstock, GA (US)

(72) Inventors: David C. Gale, Kennesaw, GA (US);
Craig J. Cochran, Atlanta, GA (US);
John Nelson, Atlanta, GA (US)

(73) Assignee: DoseLogix, LLC, Woodstock, GA (US)

( * ) Notice: Subject to any disclaimer, the term of this patent is extended or adjusted under 35 U.S.C. 154(b) by 192 days.

(21) Appl. No.: 18/388,676

(22) Filed: Nov. 10, 2023

Related U.S. Application Data

(60) Provisional application No. 63/424,330, filed on Nov. 10, 2022.

(51) Int. Cl.
*B65D 50/04* (2006.01)

(52) U.S. Cl.
CPC .................. *B65D 50/046* (2013.01)

(58) Field of Classification Search
CPC ...... B65D 50/046; B65D 41/06; B65D 41/36; B65D 2215/02; B65D 50/048; B65D 83/0011
See application file for complete search history.

(56) References Cited

U.S. PATENT DOCUMENTS

| | | | |
|---|---|---|---|
| 3,830,413 A * | 8/1974 | Birrell | B65D 41/06 222/563 |
| 5,449,078 A | 9/1995 | Akers | |
| 6,446,823 B2 | 9/2002 | Miceli et al. | |
| 7,213,994 B2 | 5/2007 | Phipps et al. | |
| 10,322,433 B2 | 6/2019 | Phipps et al. | |
| 10,435,226 B2 | 10/2019 | Phipps et al. | |
| 2009/0013642 A1 * | 1/2009 | Yuyama | B65D 41/04 53/308 |

* cited by examiner

*Primary Examiner* — Donnell A Long
(74) *Attorney, Agent, or Firm* — Luedeka Neely, P.C.

(57) ABSTRACT

A topical dosing dispenser including a child resistant closure system and/or a child resistant rotatable base system.

19 Claims, 17 Drawing Sheets

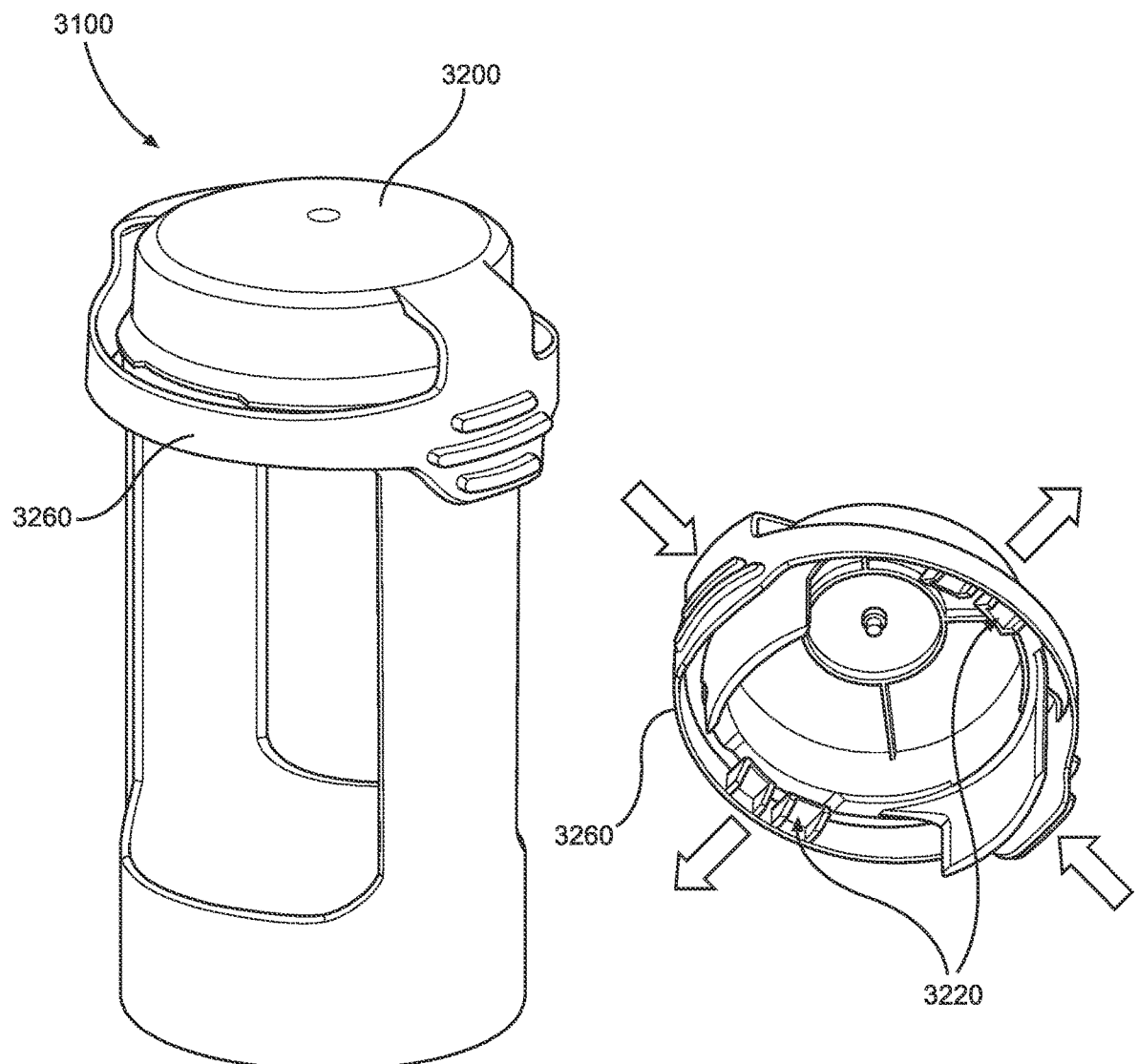

CHILD RESISTANT TOPICAL DISPENSER

CROSS REFERENCE TO RELATED APPLICATION

This application claims priority to U.S. Provisional Application Ser. No. 63/424,330 filed Nov. 10, 2023, entitled "Child Resistant Topical Dispenser," the entire contents of which is incorporated herein by reference.

FIELD

This disclosure relates to the field of child resistant topical dispensers. More particularly, this disclosure relates to a topical dispenser having a child resistant closure system and/or a child resistant rotatable base system for operating the topical dispenser.

BACKGROUND

Today, many medicines are compounded into flowable creams and lotions that are intended to be applied topically to a skin surface of a patient. Recent improvements have been made to develop topical dispensers for accurately applying a metered dosage of the flowable composition from the dispenser. For example, U.S. Pat. Nos. 7,213,994 and 10,322,433 describe metered dispensers that are configured to hold a flowable composition in a chamber, a drive screw coupled to a rotatable base, and a plunger threadingly coupled to the drive screw. In operation, rotation of the rotatable base rotates the drive screw, which in turn advances the plunger to dispense a metered amount of the flowable composition from the chamber. The U.S. Pat. Nos. 7,213,994 and 10,322,433 Patents are commonly assigned to the Applicant of the present application, and their disclosures are incorporated by reference herein in their entireties.

While modern topical dosing dispensers prove to be an effective solution for application of compounds, the ubiquitous challenge of preventing unwanted and unsafe dispensing of compounds from the dispensers by children persists. This is particularly true given the increasing use of topical opioids and corticosteroids to alleviate pain and/or treat various skin conditions. Accordingly, what is desired is an improved child resistant topical dosing dispenser that helps to prevent use of the dispenser by children while preventing spoilage of a compound, is low cost, and operates using an intuitive and mechanically simple, yet effective and easily manufactured design to prevent access to both the applicator and the dispensing mechanism.

SUMMARY

The above and other needs are met by a child resistant closure system and/or a child resistant rotatable base system for a topical dosing dispenser according to the present disclosure.

According to one embodiment of the present disclosure, a child resistant closure system for a topical dosing dispenser includes an applicator dimensioned and configured to be secured to a first end of a container body. The applicator includes a top wall having an aperture for dispensing a flowable composition from the container body and a circumferential sidewall having a plurality of cap engagement mechanisms disposed on an outer surface of the sidewall. The child resistant closure system further includes a cap dimensioned and configured to be secured to the applicator in a child resistant configuration. The cap includes a top wall for covering the aperture of the applicator when the cap is secured to the applicator and a circumferential sidewall having a plurality of applicator engagement mechanisms disposed on an interior surface of the sidewall. One or more portions of the cap are operable to be deflected such that each of the plurality of applicator engagement mechanisms are positioned and configured to engage one of the plurality of cap engagement mechanisms in the child resistant configuration when the cap is secured to the applicator and a child-resistant action is required to disengage the plurality of applicator engagement mechanisms from the plurality of cap engagement mechanisms to remove the cap from the applicator.

According to certain embodiments, the top wall of the cap is operable to be deflected to facilitate and retain engagement of the plurality of applicator engagement mechanisms with the plurality of cap engagement mechanisms. In some embodiments, the plurality of cap engagement mechanisms of the applicator each include a latch receiver having a notch and wherein each of the plurality of applicator engagement mechanisms are retained within the notches of the latch receivers when the top wall of the cap is deflected upward by the top wall of the applicator when the cap is secured to the applicator in the child resistant configuration. In some embodiments, the sidewall of the cap is operable to be deflected downward to disengage the plurality of applicator engagement mechanisms from the notches of the plurality of cap engagement mechanisms.

According to certain embodiments, when the cap is secured to the applicator in the child resistant configuration, the top wall of the applicator and the top wall of the cap are positioned and configured such that the top wall of the applicator exerts an upward force on the top wall of the cap thereby sealing the aperture in the top wall of the applicator. In some embodiments, an inner surface of the top wall of the cap further includes a sealing protrusion dimensioned and configured to be inserted into the aperture of the applicator when the cap is secured to the applicator.

According to certain embodiments, the applicator includes a dome shape such that an interstice is formed between an outer edge of the top wall of the cap and an outer edge of the top wall of the applicator when the cap is secured to the applicator. In some embodiments, the sidewall of the cap includes a plurality of arms that are operable to be deflected downward upon a push-down action on the cap to disengage the plurality of applicator engagement mechanisms from the plurality of cap engagement mechanisms. According to some embodiments, each of the plurality of arms include an upper portion that extends at least partially above the top wall of the cap when the cap is secured to the applicator.

According to another embodiment of the present disclosure, a topical dosing dispenser for a flowable composition includes a container body defining a chamber for housing the flowable composition. The chamber is dimensioned and configured to receive a plunger for dispensing the flowable composition from the chamber. The dispenser further includes a child resistant base system including: an inner base rotatable relative to the container body, the inner base including a sidewall and one or more outer base engagement mechanisms disposed along an exterior surface of the sidewall of the inner base; and an outer base configured to receive and retain the inner base. The outer base includes a sidewall disposed around the sidewall of the inner base, the side wall of the outer base positioned and configured to provide a radial gap between the sidewall of the outer base and the sidewall of the inner base, and the sidewall including one or more deflectable portions that are operable to move from an undeflected position to a deflected position. The outer base further includes one or more inner base engaging mechanisms disposed adjacent the one or more deflectable portions of the sidewall of the outer base. The dispenser further includes a drive screw having a distal end disposed within the chamber and a proximal end operatively connected to the inner base such that rotation of the inner base rotates the drive screw for moving the plunger within the chamber. In operation, when the one or more deflectable portions of the sidewall of the outer base are in the undeflected position, the outer base is configured to rotate independently of the inner base, and, when the one or more deflectable portions of the sidewall of the outer base are in the deflected position, the one or more inner base engaging mechanisms of the outer base are dimensioned and configured to traverse the radial gap between the sidewall of the outer base and the sidewall of the inner base to engage the one or more outer base engaging mechanisms of the inner base such that rotation of the outer base further rotates the inner base.

According to certain embodiments, the one or more outer base engagement mechanisms of the inner base includes a plurality of vertical ribs extending radially around the exterior surface of the sidewall of the inner base. In some embodiments, each of the one or more deflectable portions of the sidewall of the outer base includes a deflectable tab formed into the sidewall of the outer base, each of the deflectable tabs including one of the one or more inner base engaging mechanisms for engaging the plurality of vertical ribs of the inner base upon deflection of the deflectable tab.

According to certain embodiments, the outer base includes a rim positioned and configured to extend inward with from an inner surface of the sidewall of the outer base and the inner base includes a corresponding rim positioned and configured to extend outward from the exterior surface of the sidewall of the inner base, and wherein the inner base is dimensioned and configured to be retained within the outer base when the rim of the inner base traverses the rim of the outer base. According to some embodiments, the rim of the outer base is segmented with each segment disposed between adjacent deflectable portions of the sidewall of the outer base. According to some embodiments, the rim of at least one of the outer base and the inner base includes an angled ramp surface to facilitate traversal of the rim of the inner base past the rim of the outer base.

According to certain embodiments, the dispenser further includes an applicator dimensioned and configured to be secured to a first end of a container body and a cap dimensioned and configured to be secured to the applicator in a child resistant configuration. The applicator includes a top wall having an aperture for dispensing the flowable composition from the chamber of the container body and a circumferential sidewall having a plurality of cap engagement mechanisms disposed on an outer surface of the sidewall. The cap includes a top wall for covering the aperture of the applicator when the cap is secured to the applicator and a circumferential sidewall having a plurality of applicator engagement mechanisms disposed on an interior surface of the sidewall. In operation, one or more portions of the cap are operable to be deflected such that each of the plurality of applicator engagement mechanisms are positioned and configured to engage one of the plurality of cap engagement mechanisms in the child resistant configuration when the cap is secured to the applicator and a child-resistant action is required to disengage the plurality of applicator engagement mechanisms from the plurality of cap engagement mechanisms to remove the cap from the applicator. According to some embodiments, the sidewall of the cap includes a plurality of arms that are operable to be deflected downward upon a push-down action on the cap to disengage the plurality of applicator engagement mechanisms from the plurality of cap engagement mechanisms.

According to another embodiment of the present disclosure, a topical dosing dispenser includes a container body defining a chamber for housing a flowable composition, the container body including a first end and a second end. A child resistant closure system is configured to be operatively secured to the first end of the container body, the child resistant closure system including an applicator and a cap with the cap configured to be secured to the applicator in a child resistant configuration such that a child resistant action is required to remove the cap from the applicator. A child resistant rotatable base system is configured to be operatively secured to the second end of the container body, the child resistant rotatable base system including an inner base and an outer base configured to be retained within the inner base such that a child resistant action is required to rotate the inner base using the outer base. In operation, rotation of the inner base is operable to rotate a drive screw having a proximal end operatively connected to the inner base and a distal end disposed within the chamber of the container body.

According to certain embodiments, the child resistant base system includes an inner base rotatable relative to the container body, the inner base including a sidewall and one or more outer base engagement mechanisms disposed along an exterior surface of the sidewall of the inner base. The child resistant base system further includes an outer base configured to receive and retain the inner base. The outer base includes a sidewall disposed around the sidewall of the inner base, the side wall of the outer base positioned and configured to provide a radial gap between the sidewall of the outer base and the sidewall of the inner base, and the sidewall including one or more deflectable portions that are operable to move from an undeflected position to a deflected position. The outer base further includes one or more inner base engaging mechanisms disposed adjacent the one or more deflectable portions of the sidewall of the outer base. In operation, the inner base is configured to receive the proximal end of the drive screw such that, when the one or more deflectable portions of the sidewall of the outer base are in the undeflected position, the outer base is configured to rotate independently of the inner base, and, when the one or more deflectable portions of the sidewall of the outer base are in the deflected position, the one or more inner base engaging mechanisms of the outer base are dimensioned and configured to traverse the radial gap between the sidewall of the outer base and the sidewall of the inner base to engage the one or more outer base engaging mechanisms of the inner base such that rotation of the outer base further rotates the inner base.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 19 is a perspective view of a child resistant sleeve with incorporated cap for a topical dosing dispenser in accordance with one embodiment of the present disclosure.

FIG. 20 is a bottom perspective view of the cap portion of the child resistant sleeve of FIG. 19 in accordance with one embodiment of the present disclosure.

DETAILED DESCRIPTION

The present disclosure relates to a topical dosing dispenser having various child resistant features including a child resistant closure system and a child resistant rotatable base system. The child resistant features described herein are particularly suited for use with a dosing dispenser designed for a flowable, topically administered medicine, such as a cream-based or lotion-based medicine (referred to herein as a "flowable composition").

Figure 1:
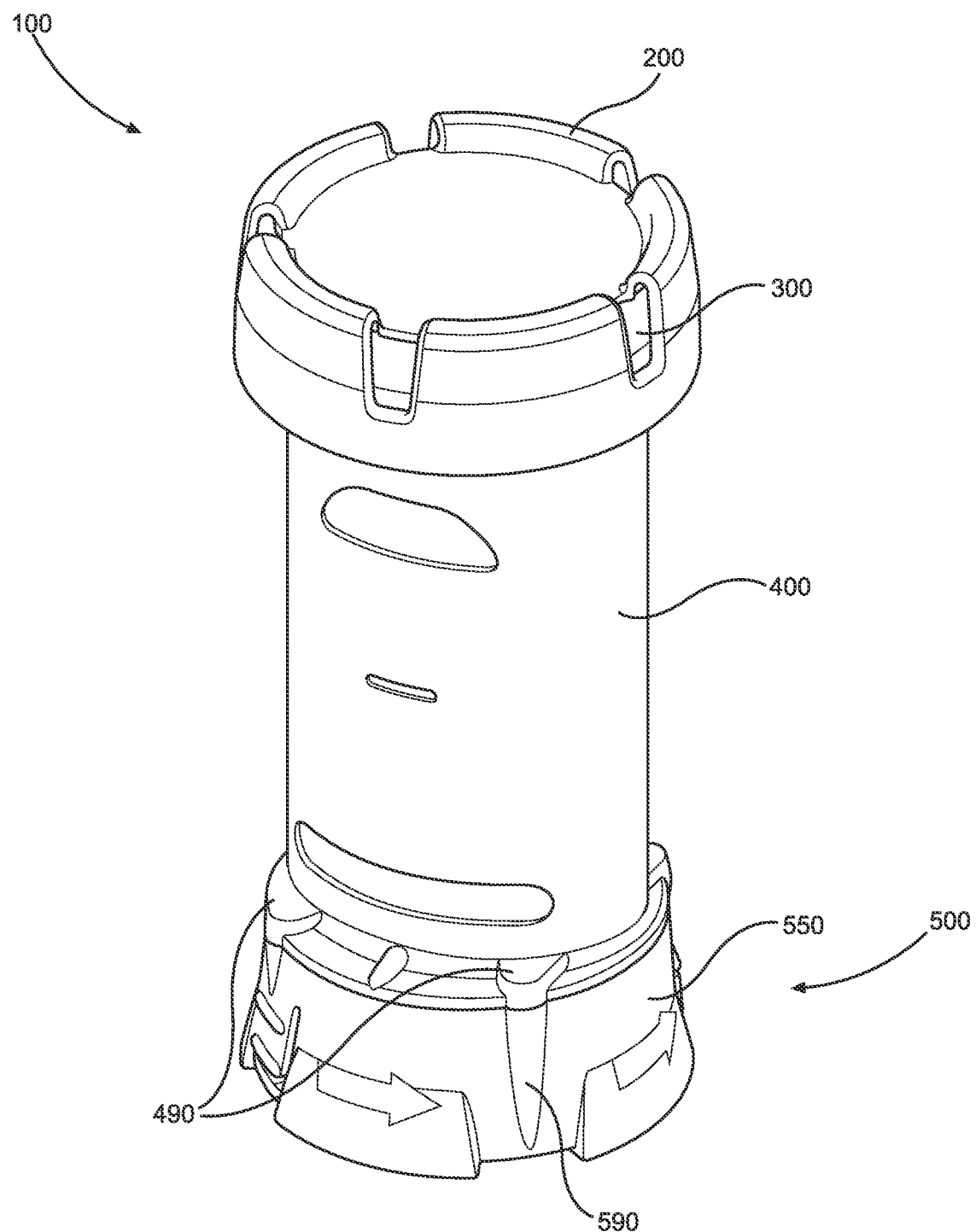
FIG. 1 is a perspective view of a dosing dispenser in accordance with one embodiment of the present disclosure.
Figure 2:
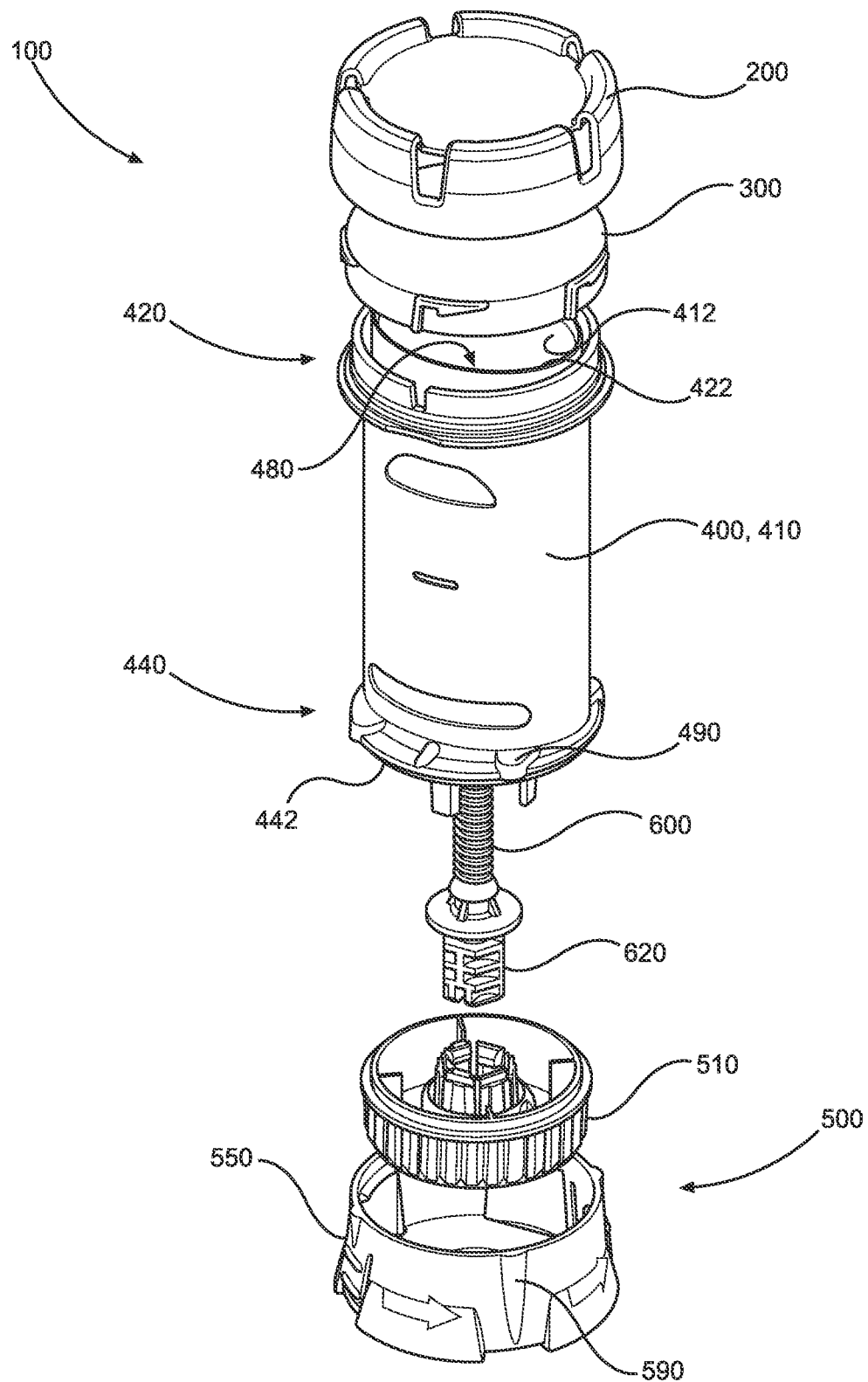
FIG. 2 is an exploded perspective view of the different components of the dosing dispenser of FIG. 1 in accordance with one embodiment of the present disclosure.

FIGS. 1-2 illustrate one exemplary embodiment of a dosing dispenser 100 of the present disclosure that is configured to dispense a flowable composition. The dosing dispenser 100 generally includes a cap 200, an applicator 300, a container body 400, a rotatable base system 500 including an inner base 510 and an outer base 550, and a drive screw 600. The component parts forming the dispenser 100 may be formed of materials such as, but not limited to, polymer, plastic, composite, or other formable or moldable materials.

Figure 3:
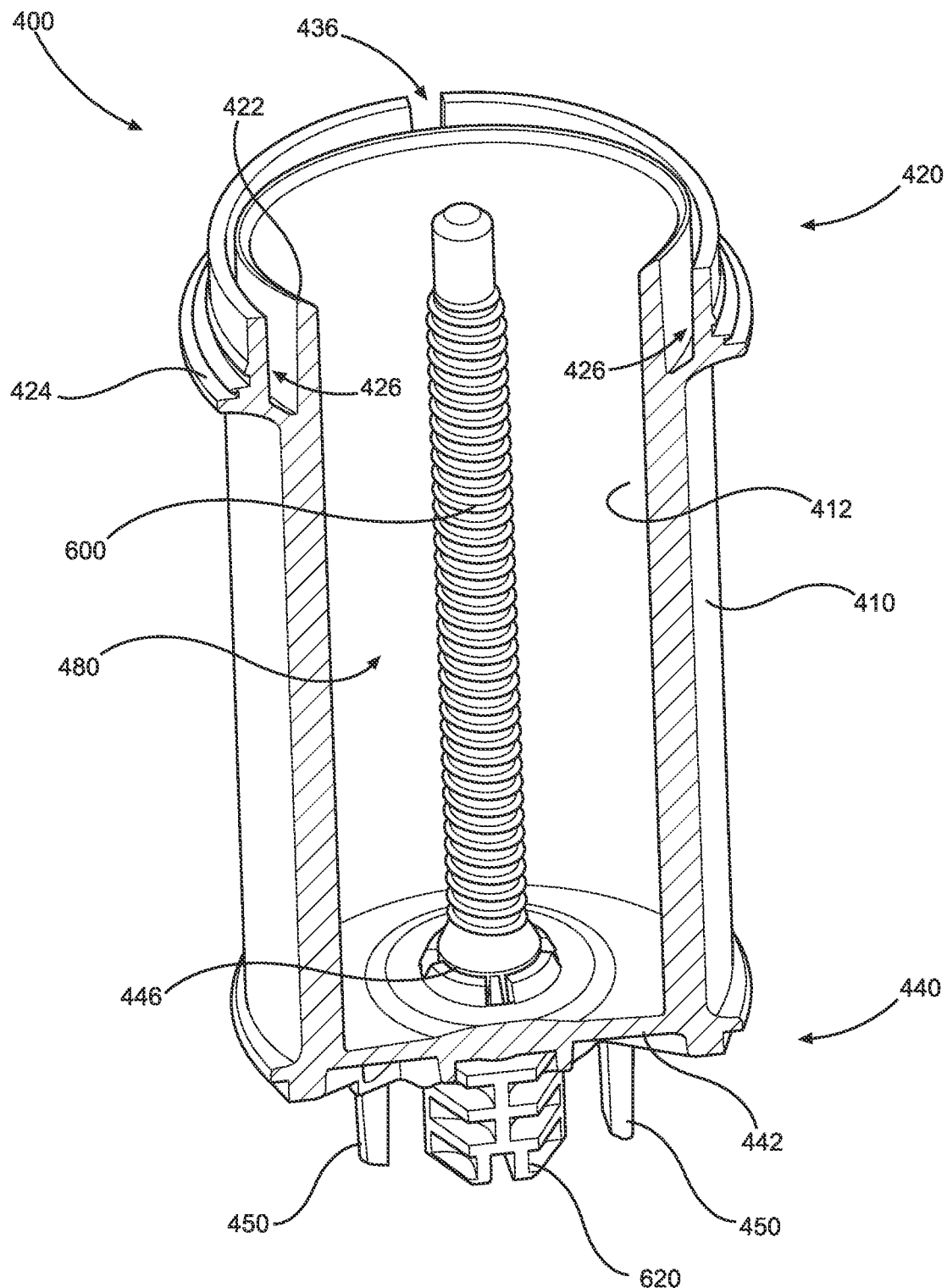
FIG. 3 is a cross-sectional perspective view of a container body with a drive screw rotatable secured thereto in accordance with one embodiment of the present disclosure.

With reference to FIGS. 2-3, the container body 400 includes an outer wall 410, an inner wall 412, a first end 420 (i.e., neck region) having an open edge 422, and a second end 440 having a bottom wall 442. The inner wall 412 extends from the open edge 422 of the first end 420 to the bottom wall 442 of the second end 440 to define a chamber 480 for storing the flowable composition. The bottom wall 442 includes an aperture 446 configured to operatively receive the drive screw 600 such that the threads of the drive screw 600 are disposed within the chamber 480 from proximate the first end 420 to proximate the second end 440. The cross-section of the chamber 480 and corresponding shape of the body 400 may take various shapes including circular, oval, elliptical, parabolic, other irregular circular, polygonal (e.g., triangular, square, hexagonal), rectilinear, or any other desired shape. A plunger (not shown) is disposed within the chamber 480 and configured to be operatively connected to the threads of the drive screw 600 such that the plunger advances through the chamber 480 upon rotation of the drive screw 600 to extract the flowable composition from the chamber 480.

As depicted herein, the first end 420 is the dispensing end of the container body 400. Thus, with reference to FIGS. 4-6, the applicator 300 having one or more dispensing apertures 380 in a top wall 310 of the applicator is operable to be secured to the first end 420 such that the dispensing apertures 380 are aligned with the chamber 480 of the container body 400. With reference to FIGS. 7-11, the rotatable base system 500 is then secured to the second end 440 of the container body 400 with the drive screw 600 operatively connected to the rotatable base system 500. In operation, rotation of the rotatable base system 500 causes rotation of the drive screw 600, which causes the plunger to advance through the chamber 480 for dispensing the flowable composition stored within the chamber 480 through the one or more dispensing apertures 380 of the applicator 300. As shown, the top wall 310 of the applicator preferably includes a dome shape to provide comfort to the user when applying the flowable composition dispensed from the dosing dispenser 100.

Figure 4:
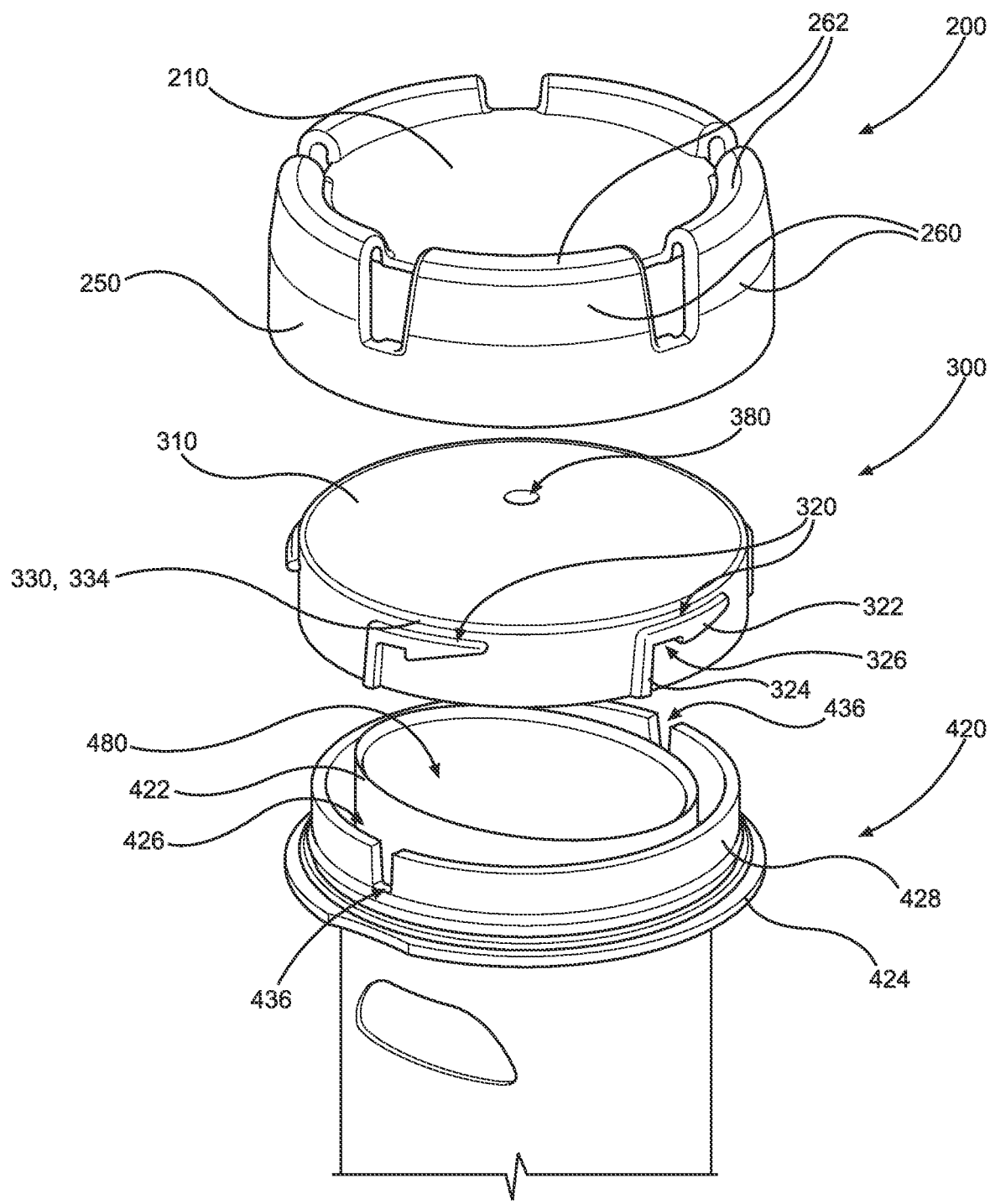
FIG. 4 is a first exploded perspective view of the first end of the container body, the applicator, and the cap in accordance with one embodiment of the present disclosure.
Figure 5:
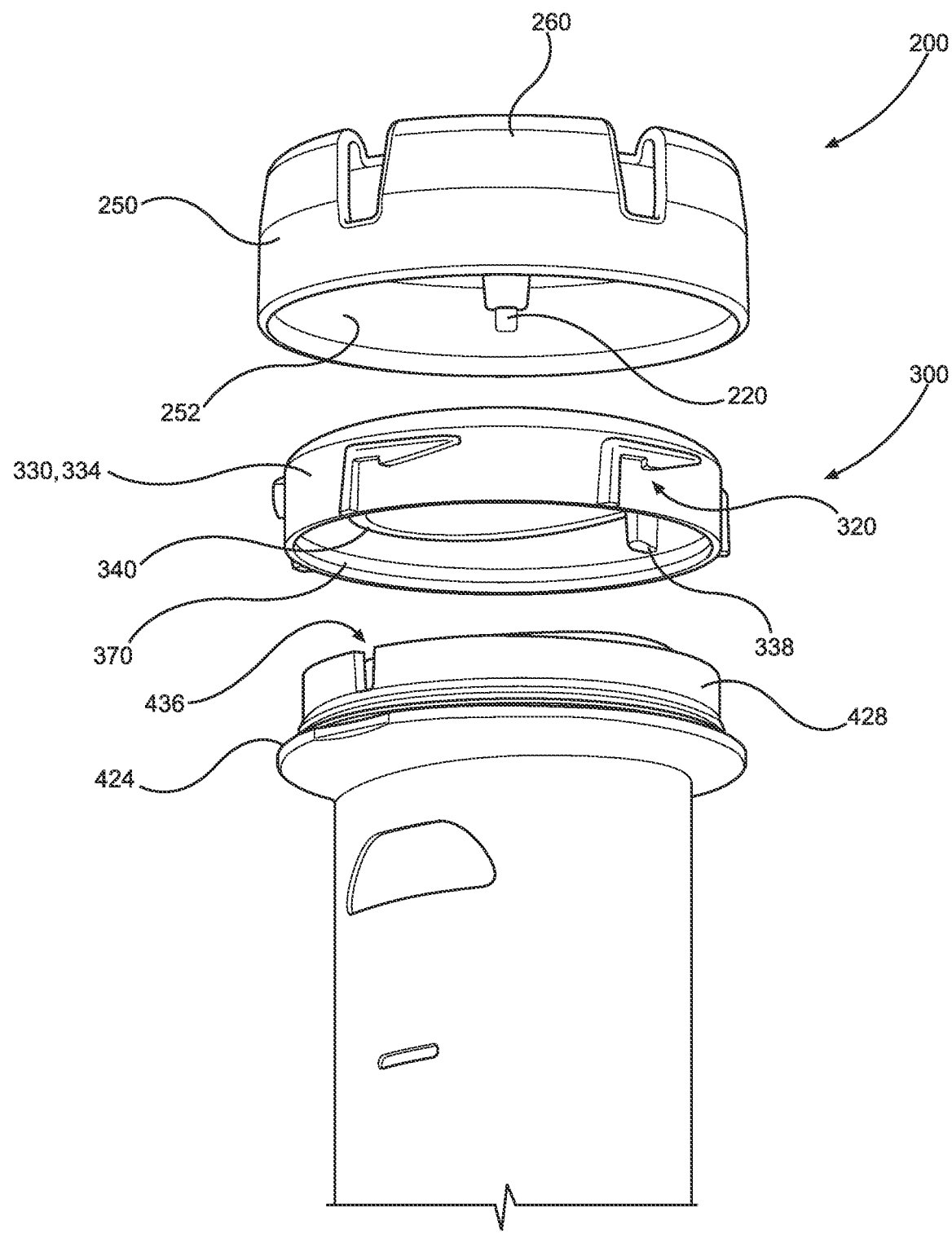
FIG. 5 is a second exploded perspective view of the first end of the container body, the applicator, and the cap in accordance with one embodiment of the present disclosure.
Figure 6:
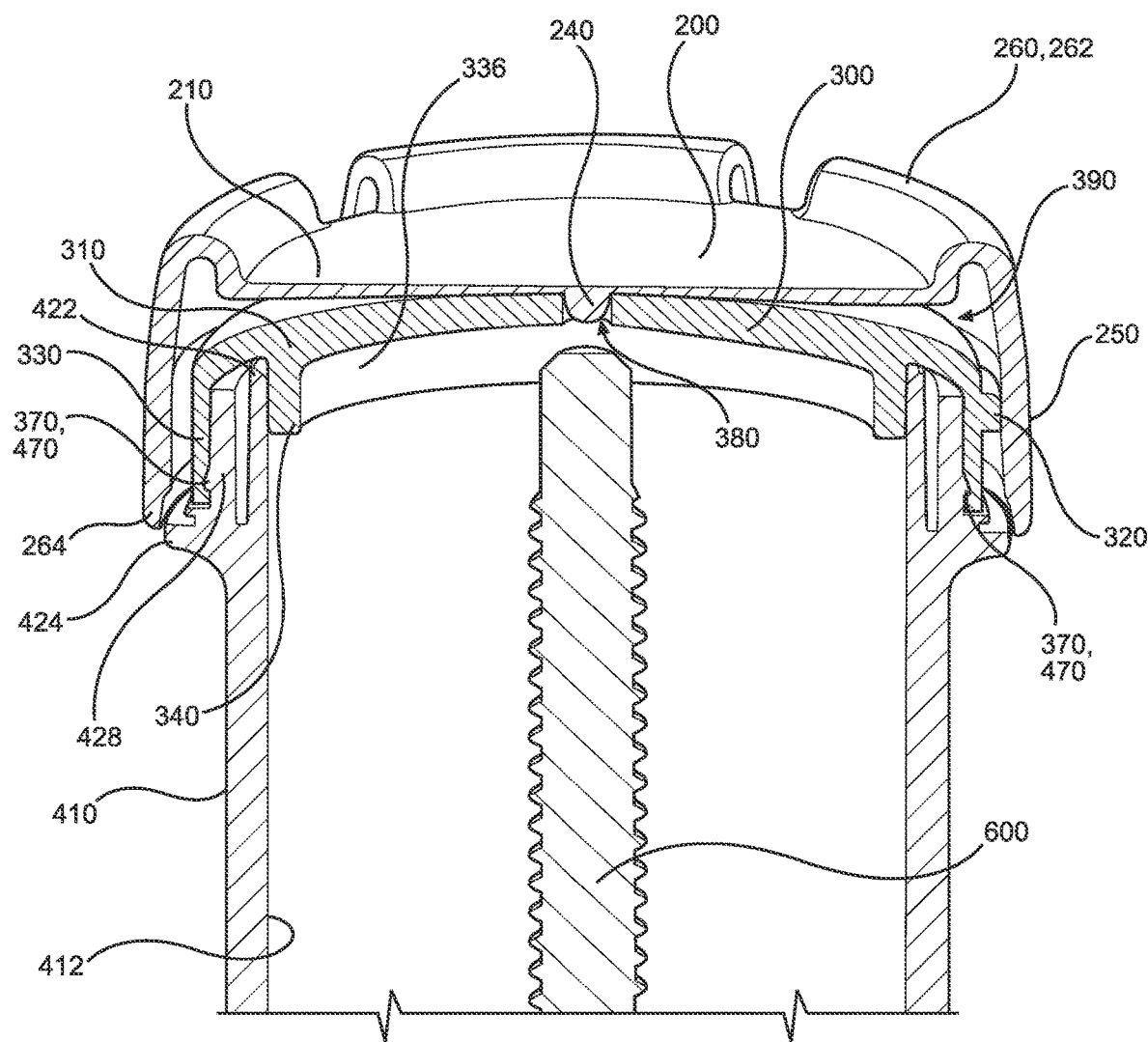
FIG. 6 is a side cross-sectional view of the applicator secured to a first end of the container body and the cap secured to the applicator in accordance with one embodiment of the present disclosure.

With reference to FIGS. 4-6, the applicator 300 is configured to be secured to the first end 420 of the container body 400 such that the top wall 310 of the applicator 300 provides a closing seal around the open edge 422 of the chamber 480 except with respect to the one or more dispensing apertures 380. While the applicator 300 may be secured to the first end 420 of the container body 400 in various ways, the first end 420 preferably includes a circumferential container rim 424 extending radially outward from the container body 400 and a circumferential sidewall 428 extending up from the container rim 424. As shown, the sidewall 428 is positioned and configured to surround the open edge 422 of the chamber 480 while providing a grooved space 460 between the sidewall 428 and the top portion of the chamber 480 that extends above the rim 424. Disposed within the sidewall 428 are one or more notches 436.

To secure the applicator 300 to the first end 420 of the container body 400, the applicator 300 includes an outer sidewall 330 extending down from the outer edge of the top wall 310 and an inner sidewall 340 extending down from an interior portion of the top wall 310. The circumference of the inner sidewall 340 is slightly smaller than the circumference of the open edge 422 of the chamber 480 as depicted best in FIG. 6. Thus, when the applicator 300 is secured to the first end 420 of the container body, the inner sidewall 340 extends slightly down into the chamber 480 such that the inner sidewall 340 and top wall 310 seal the open edge 422 of the chamber 480 while the outer sidewall 330 is positioned around the sidewall 428 of the first end 420 of the container body 400. To facilitate alignment of the inner sidewall 430 with respect to the open edge 422 of the chamber 480, the applicator 300 further includes one or more tabs 338 that are positioned and configured to fit within the notches 436 of the sidewall 428 when the applicator 300 is properly positioned with respect to the first end 420 of the container body 400. The tabs 338 positioned within the notches 436 also functions to prevent axial rotation of the applicator 300 with respect to the container body 400 when the applicator 300 is secured to the first end 420 of the container body 400.

To further facilitate securing the applicator 300 to the first end 420 of the container body 400, and as shown best in FIGS. 5 and 6, the inner surface of the outer sidewall 330 of the applicator 300 preferably includes a circumferential closure groove 370 while the first end 420 of the container body 400 includes a corresponding circumferential ridge 470 disposed above the rim 424. When the applicator 300 is installed on the first end 420 of the container body 400, the container ridge 470 engages with the closure groove 370 to secure the applicator 300 to the container body 400.

With reference to FIGS. 4-6, the cap 200 includes a top wall 210 and circumferential sidewall 250. With reference to FIG. 6, one or more plugs 240 extend inward from the top wall 210. The one or more plugs 240 are positioned and configured such that they are operable to be inserted into the one or more dispensing apertures 380 of the applicator 300 when the cap 200 is installed on the applicator 300. As shown in FIG. 6, and as a result of the dome shape of the top wall 310 of the applicator 300, an interstice 390 is disposed between the outer edges of the top wall 210 of the cap 200 and the top wall 310 of the applicator 300.

According to one aspect of the present disclosure, and with continued reference to FIGS. 4-6, the dosing dispenser 100 preferably includes a first child-resistant feature in the form of a child resistant closure system for removal of the cap 200 from the applicator 300. In this regard, the applicator 300 of this embodiment includes one or more cap engagement mechanisms 320 extending from the outer surface 334 of outer sidewall 330. The cap 200 then includes a corresponding one or more applicator engagement mechanisms 220 disposed on an interior surface 252 of sidewall 250 that are dimensioned and configured to engage the one or more cap engagement mechanisms 320 of the applicator 300 when the cap 200 is secured to the applicator 300. When the one or more applicator engagement mechanisms 220 of the cap 200 are in an engaging relationship with the one or more cap engagement mechanisms 320 of the applicator 300, a child resistant type action (e.g., push-down-and-turn action on the cap and/or deflection of at least one of the one or more cap engagement mechanisms 320 and one or more applicator engagement mechanisms 220) is then required to remove the cap 200 from the applicator 300. In other words, the one or more applicator engagement mechanisms 220 and corresponding one or more cap engagement mechanisms 320 are dimensioned and configured to provide the first child resistant feature of the dosing dispenser 100 in which a child resistant type action is required to remove the cap 200 from the applicator 300 to dispense the flowable composition from the dosing dispenser 100.

While the respective engagement mechanisms may take various forms, the one or more cap engagement mechanisms 320 are preferably in the form of a plurality of spaced-apart latch receivers 320. According to this embodiment, each latch receiver includes a locking ramp 322 and a locking edge 324 with a notch 326 formed therebetween. The one or more applicator engagement mechanisms 220 then take the form of a corresponding plurality of spaced-apart locking protrusions 220 disposed on an interior surface of the sidewall 250 of the cap 200. In operation, when the cap 200 is placed over the applicator 300 and rotated in a first direction (e.g., clockwise), each locking protrusion 220 is operable to traverse one of the locking ramps 322 such that the protrusions engage and are retained in one of the notches 326. The traversal of the locking ramps 322 by the locking protrusions 220 is facilitated by the slope of the locking ramps 322, which causes a slight deflection of the top wall 210 of the cap 200 as the locking protrusions 220 move along the length of the locking ramps 322. Upon traversal, the top wall 210 remains in a deflected state to retain the locking protrusions 220 within the notches 326. The engagement of the locking protrusions 220 with the notches 326 prevents further rotation of the cap 200 in either the first direction (e.g., clockwise) or a second direction (e.g., counterclockwise). Thus, to disengage the locking protrusions 220 from the notches 326, the user must perform a push-down-and-turn action on the cap 200 to lower the protrusions 220 with respect to the latch receivers 320. With the protrusions lowered, the cap 200 can be rotated in the second direction back past the locking ramps 322 such that removal of the cap 200 from the applicator 300 is possible.

As described above, the deflectability of the top wall 210 of the cap 200 facilitates the insertion and then retention of the locking protrusions 220 of the cap 200 within the notches 326 of the applicator 300. More specifically, the close dimensions of the cap 200 and corresponding applicator 300 results in the top wall 310 of the applicator 300 exerting an upward force on the top wall 210 of the cap 200 when the cap 200 is installed on the applicator 300. The cap 200 is dimensioned and configured such that this upward force is sufficient to deflect the top wall 210 of the cap 200 to both facilitate the retention of the locking protrusions 220 in the notches 326 and enhance the sealing effect of the one or more plugs 240 of the cap 200 inserted into the one or more dispensing apertures 380 of the applicator 300 as described above.

In addition to being formed of a deflectable material, the sidewall 250 of the cap 200 may include certain features to enhance its deflective properties in relation to the top wall 210. For example, with reference to FIG. 4, the sidewall 250 of the cap 200 may be defined in part by a plurality of deflectable arms 260. More specifically, with the cap 200 installed on the applicator 300, the arms 260 are operable to be deflected downward upon a push-down action on the cap 200 such that the locking protrusions 220 disposed on the interior surface of the sidewall 250 are lowered with respect to the notches 326. To further facilitate the deflection, each arm 260 preferably includes an upper portion 262 connected to the top wall 210 with a space provided between adjacent arms 260. Further, the upper portions 262 preferably extend upward slightly from the top wall 210 in their undeflected state such that the arms 260 are more ergonomically accessible when the user pushes down on the top wall 210 of cap 200 with the palm of their hand like traditional push-down-and-turn closure actions. Similarly, the raised arms 260 and preferable dome shape of the top wall 310 of the applicator 300 enhance the interstice 390 underneath the outer edge of the top wall 310 of the applicator 300 to further facilitate the ability to deflect the sidewall 250 downward.

According to preferred embodiments, and with continued reference to FIG. 6, the circumference of the lower end of the sidewall 250 is dimensioned and configured such that the lower end 264 of the sidewall is substantially aligned with the container rim 424. This helps prevents children from attempting to bypass the child resistant feature of the cap 200 and corresponding applicator 300 by prying off the cap 200 from the applicator 300.

While the sidewall 250 of the cap 200 is described above as being deflectable to provide the child resistant capability of the cap 200, other portions of the cap 200 and/or applicator 300 could be configured to be deflectable to achieve the desired engagement and disengagement of the respective engagement mechanisms 220, 320. For example, a deflectable/resilient ring member could be included underneath the top wall 210 of cap 200. According to this embodiment, the deflectable ring member is disposed between the top wall 210 of the cap and the top wall 310 of the applicator such that pushing down on the cap 200 causes compression of the deflectable ring member, which lowers the entire cap 200 with respect to the applicator 300. In yet another potential embodiment, the engagement mechanism (s) of either the cap 200 or applicator 300 could be configured to be deflectable. For example, the one or more engagement mechanisms 320 of the applicator 300 could be configured to deflect upward or downward along the length of the sidewall 330. According to this embodiment, rotation of the cap 200 with respect to the applicator 300 would cause the one or more engagement mechanisms 320 of the applicator 300 to deflect to receive/engage the corresponding one or more engagement mechanisms 220 of the cap 200. To disengage the engagement mechanisms, the one or more engagement mechanisms 320 of the applicator would remain accessible to the user to allow for removal of the cap from the applicator (i.e., the engagement mechanism(s) 320 would include a deflectable portion that extends out from or underneath the cap 200 when the cap 200 is installed on the applicator).

Deflection of the cap 200 and/or the applicator 300 may be accomplished by virtue of several features, separately or in combination. In certain embodiments, the applicator 300 may have a first flexural modulus, and the cap 200 may have a second flexural modulus. The flexural modulus may be determined by the materials used to form the respective components and/or the thickness of the walls of the respective components. Suitable materials may include, but are not limited to, high density polyethylene, low density polyethylene, polyethylene terephthalate, polypropylene, and other similar suitable materials with like properties. Depending upon which component is desired to be deflectable, the first and second flexural moduli may be different. Where deflection of the cap 200, but not the applicator 300, is desired, the first flexural modulus is greater than the second flexural modulus. Where deflection of the applicator 300, but not the cap 200, is desired, the second flexural modulus is greater than the first flexural modulus.

According to another aspect of the present disclosure, and with reference to FIGS. 7-11, the dosing dispenser 100 preferably includes a second child resistant feature in the form of a child resistant rotatable base system 500. In certain embodiments, the dosing dispenser includes either the child resistant closure system described above or the child resistant rotatable base system 500. In other embodiments, the dosing dispenser 100 includes both the child resistant closure system and the child resistant rotatable base system.

Figure 8:
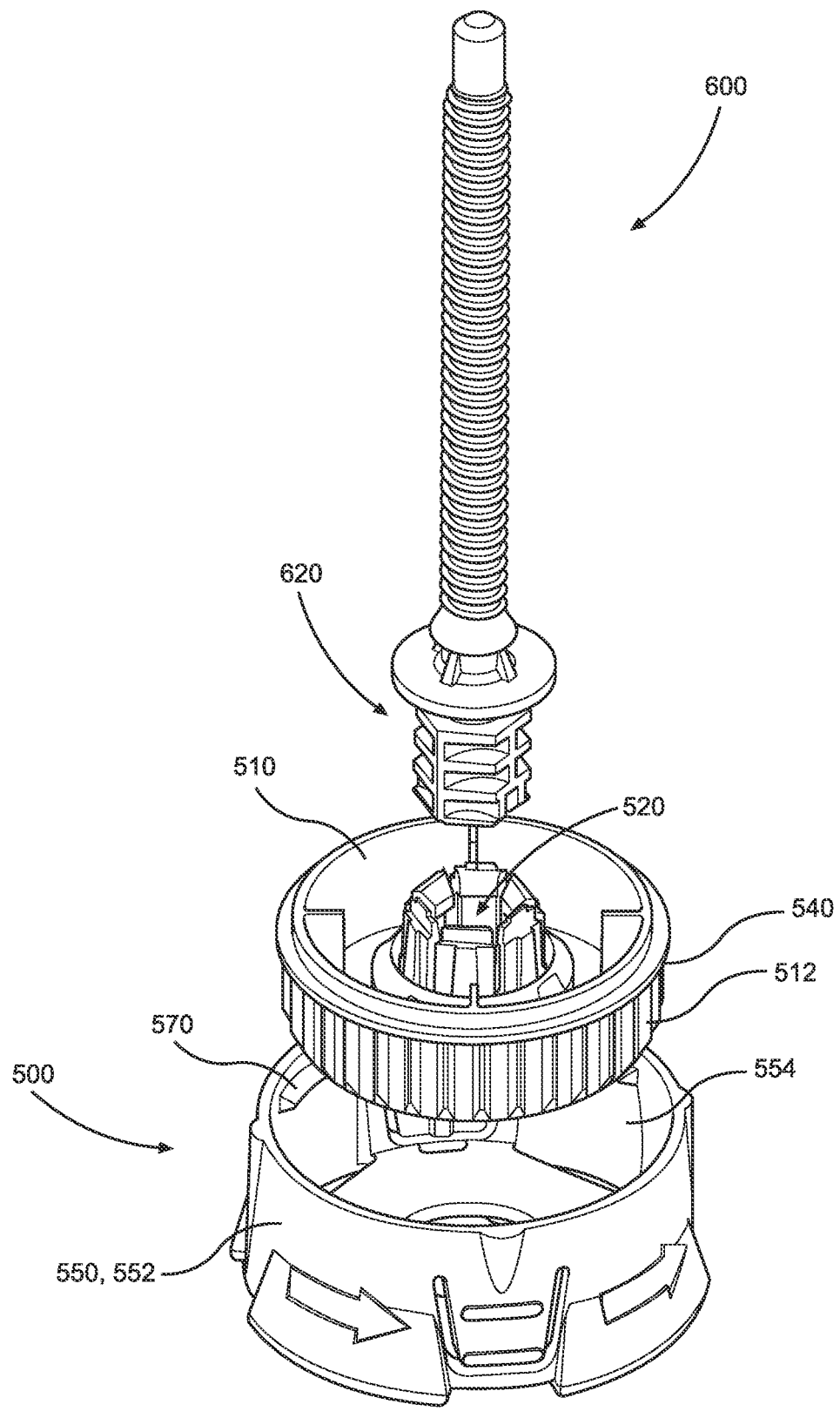
FIG. 8 is an exploded perspective view of the drive screw and rotatable base system in accordance with one embodiment of the present disclosure.
Figure 9:
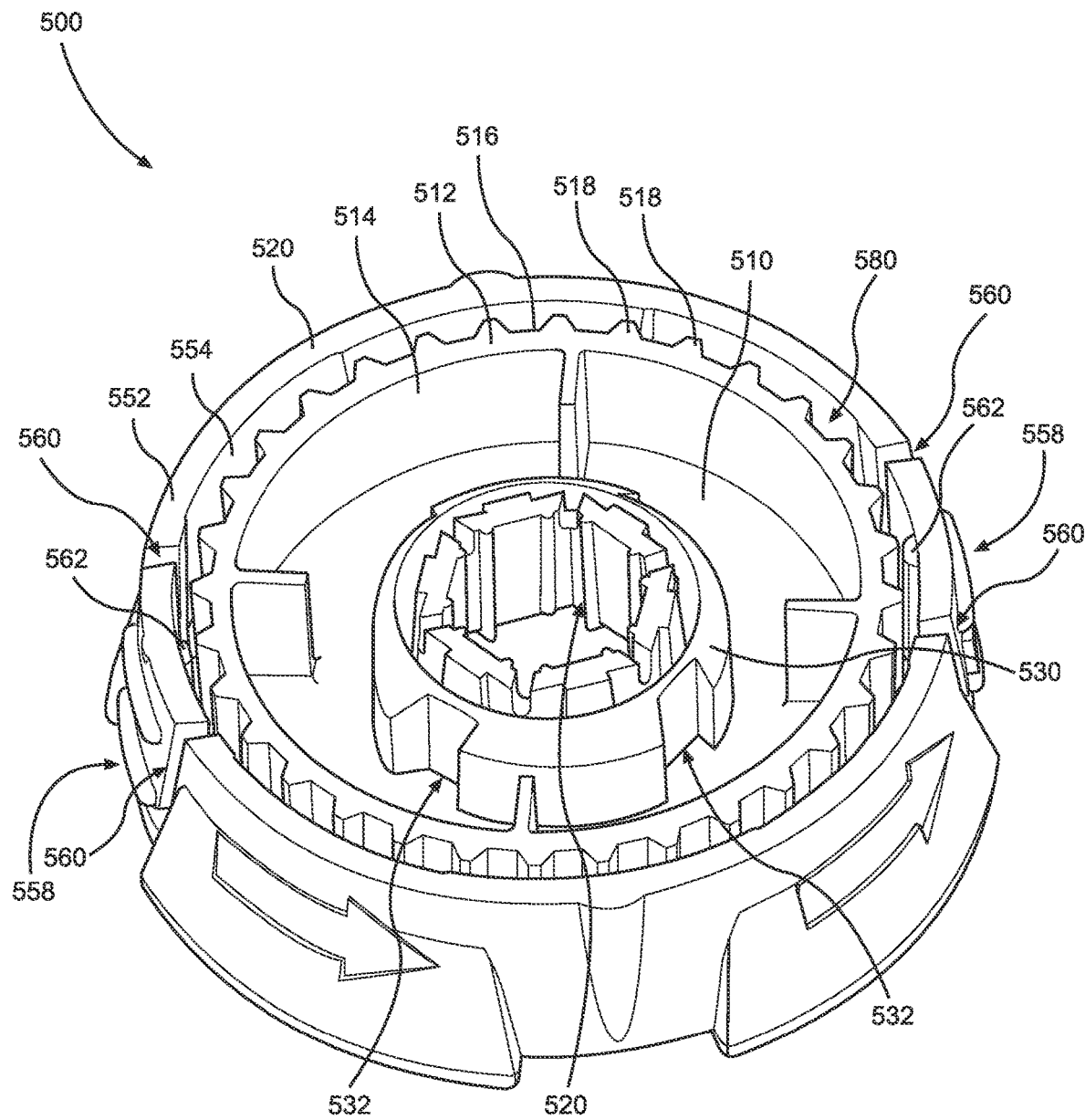
FIG. 9 is an overhead cross-sectional view of the inner base and outer base of the rotatable base system in accordance with one embodiment of the present disclosure.
Figure 10:
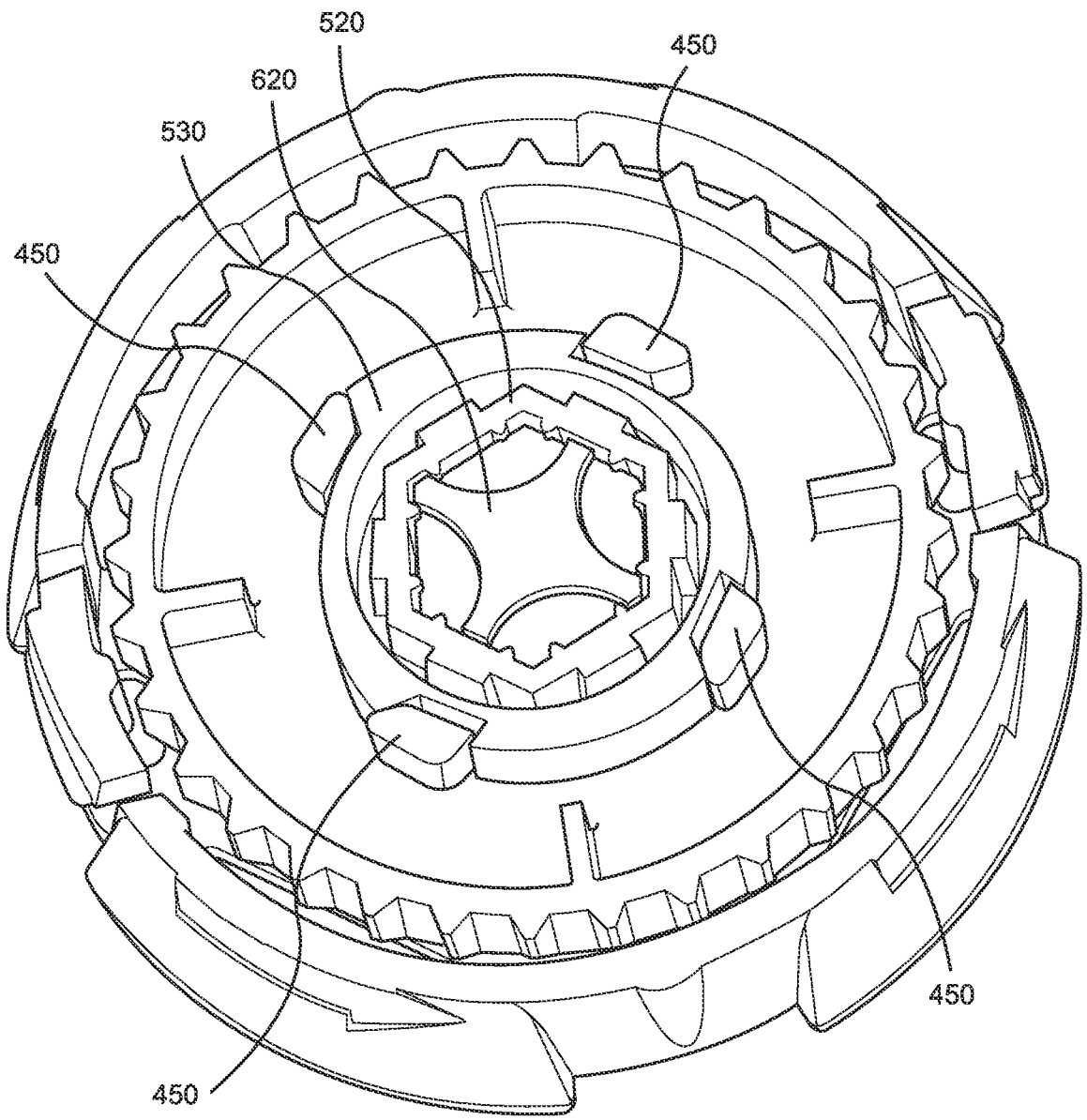
FIG. 10 is an overhead cross-sectional view of the rotatable base system with the distal end of the drive screw engaging the drive screw engaging portion of the inner base and the base engaging tabs of the container body engaging the notches of the container body engaging portion of the inner base in accordance with one embodiment of the present disclosure.

With reference first to FIGS. 8-9, the rotatable base system 500 includes an inner base 510 and an outer base 550 disposed around the inner base 510. The inner base 510 includes a circumferential side wall 512 having an inner surface 514 and an outer surface 516. The inner base 510 further includes a drive screw engaging portion 520 that is operable to engage a proximal end 620 of the drive screw 600 to secure the drive screw 600 to the rotatable base system 500.

Figure 7:
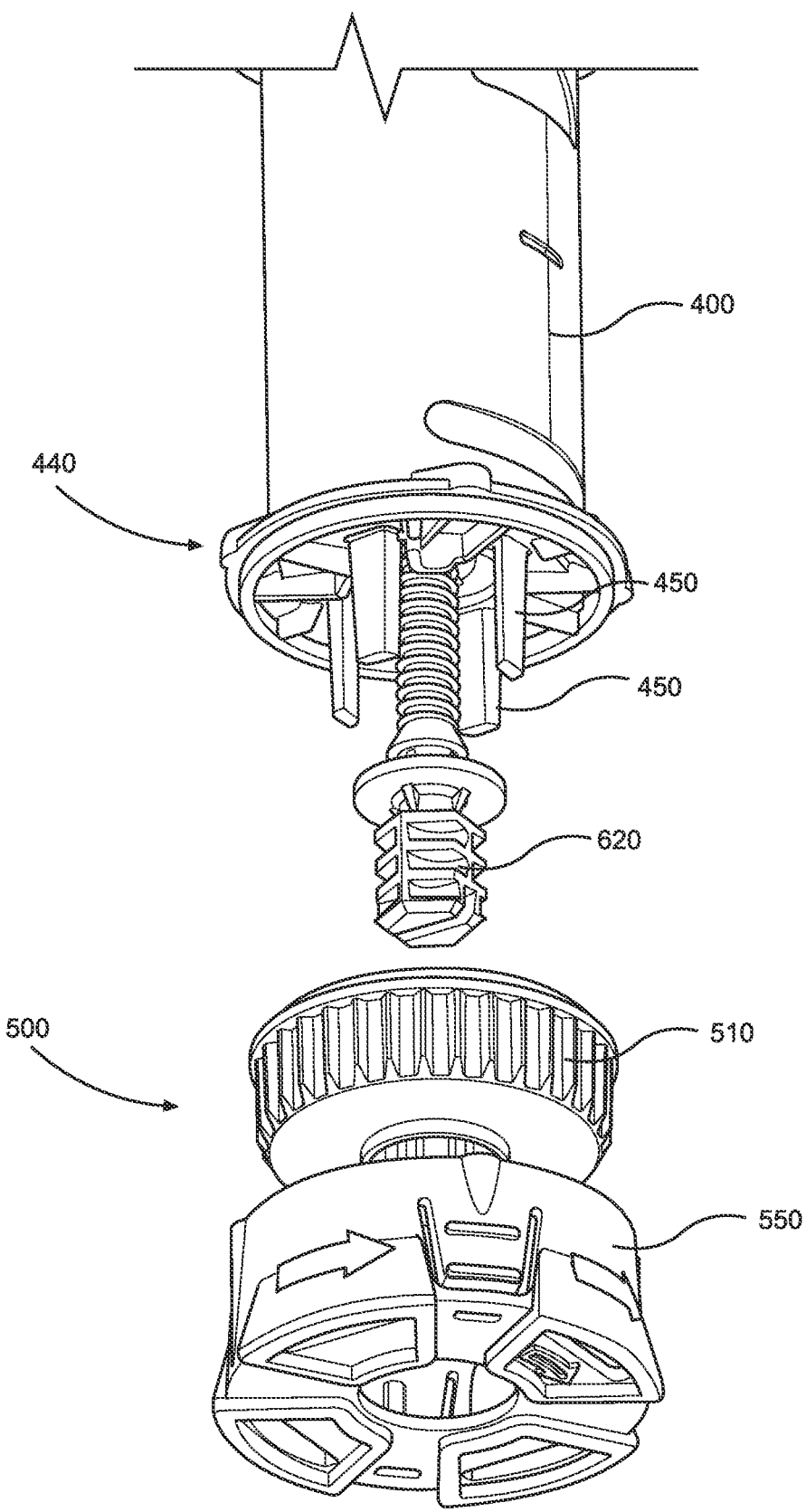
FIG. 7 is an exploded perspective view of the second end of the container body and the rotatable base system in accordance with one embodiment of the present disclosure.
Figure 11:
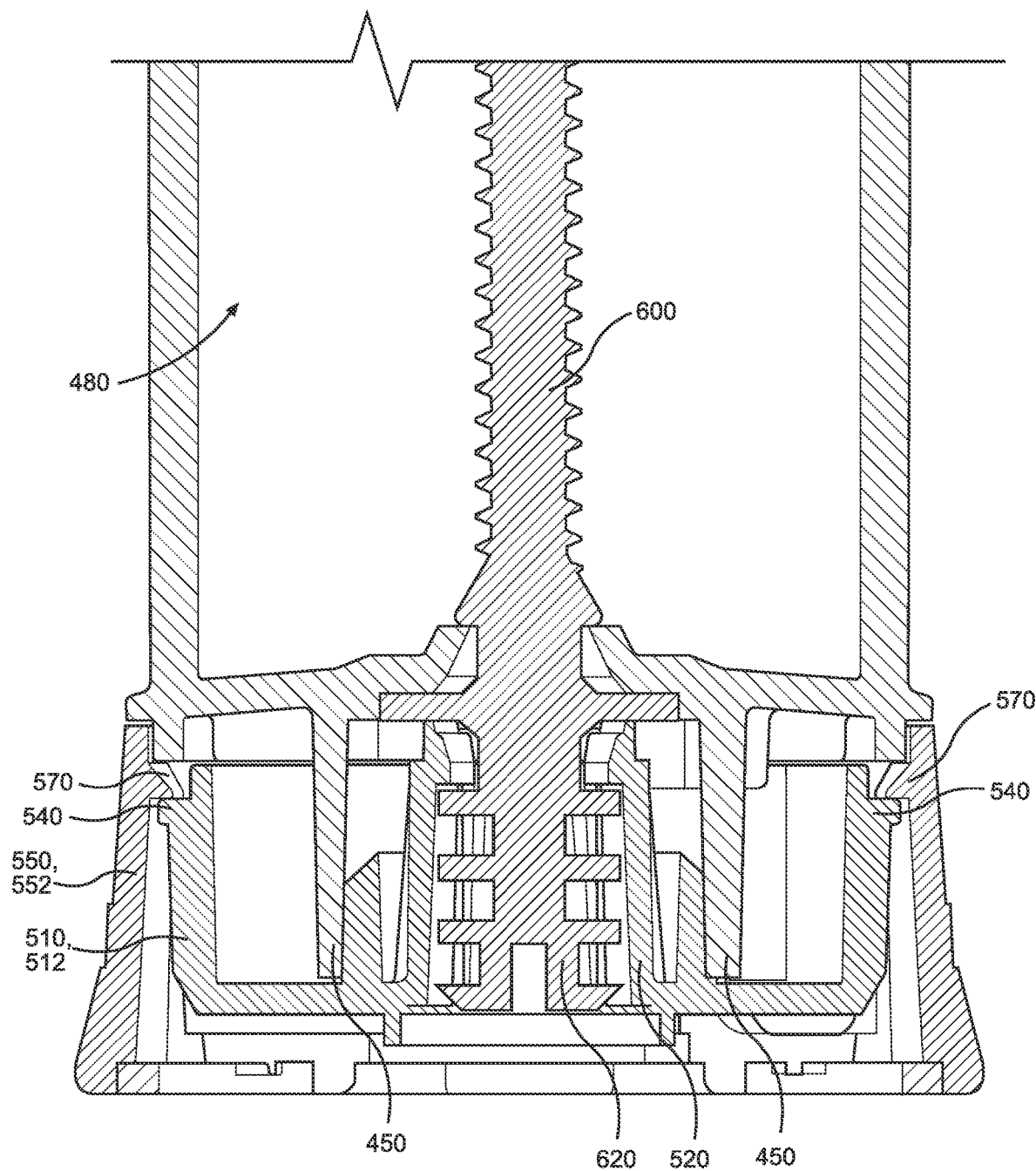
FIG. 11 is a side cross-sectional view of the second end of the container body with the drive screw and rotatable base system secured thereto in accordance with one embodiment of the present disclosure.

As best shown in FIG. 9, the inner base 510 further includes a container body engaging portion 530 that is operable to rotatably engage one or more base engaging tabs 450 extending from the second end 440 of the container body 400 (the base engaging tabs 450 being depicted best in FIGS. 3, 7, and 11). According to the embodiment shown, the container body engaging portion 530 includes a plurality of notches 532 disposed around the drive screw engaging portion 520. As depicted best in FIG. 10, the base engaging tabs 450 and corresponding notches 532 are dimensioned and configured with appropriate angled surfaces and locking edges for providing rotation of the notches 532 with respect to the base engaging tabs 450 in a first direction (e.g., permitting counter-clockwise rotation for advancement of the plunger through the chamber 480) while preventing rotation in a second direction (e.g., preventing clockwise rotation to prevent the plunger from moving backwards within the chamber 480). Further, each of the plurality of notches 532 are preferably disposed along the container body engaging portion 530 equidistantly apart from each other to provide both an indexing and clicking feature between the inner base 510 and the container body 400 as the inner base 510 is rotated during dispensing. This provides for a measured rotation of the drive screw 600 per rotation of the inner base 510 (i.e., per "click"). In other words, for each predetermined degree of rotation of the inner base 510 (e.g., ¼ rotation), the base engaging tabs 450 disengage from the notches 532 and then re-engage the notches 532 once the predetermined degree of rotation is completed. During the reengagement, the tabs 450 and corresponding notches 432 preferably provide the audible click as well as a tactile indication to the user that the predetermined degree of rotation is completed.

Together, the drive screw 600 being in engagement with the drive screw engaging portion 520 of the inner base 510 (with the drive screw 600 then in operable engagement with the container body 400 as best depicted in FIGS. 3 and 7) and the engaging tabs 450 of the container body 400 being in engagement with the container body engaging portion 530 of the inner base 510 rotatably secures the inner base 510 to the container body 400. Accordingly, during operation of the assembled dosing dispenser 100, rotation of the inner base 510 causes rotation of the drive screw 600 within the chamber 480. The drive screw 600 being rotated but locked into place by the inner base 510 causes the plunger (not shown) to advance through the chamber 480 along the length of the threaded drive screw 600.

With reference again to FIG. 9, inner base 510 further includes one or more outer base engaging mechanisms 518 disposed adjacent the outer surface 516 of the sidewall 512. The outer base 550 is configured to be rotatably positioned around the inner base 510 such that there is a radial gap 580 between the outer surface 516 of the sidewall 512 of the inner base 510 and an interior surface 554 of the sidewall 552 of the outer base 550. The interior surface 554 of the sidewall 552 of the outer base 550 then includes one or more corresponding inner base engaging mechanisms 558. In operation, at least the portions of the sidewall 552 adjacent the inner base engaging mechanisms 558 is deflectable. Thus, in a deflected position, the one or more inner base engaging mechanisms 558 of the outer base 550 are dimensioned and configured to engage the one or more outer base engaging mechanisms 518 of the inner cap 510 such that rotation of the outer base 500 causes rotation of the inner base 510. On the other hand, in an undeflected position, the radial gap 580 between the inner base 510 and outer base 550 provides independent rotation of the outer base 550 with respect to the inner base 510. In preferred embodiments, the inner base engaging mechanisms 558 are resilient such that they return to the undeflected position upon ceasing of the deflecting action performed by the user.

In certain embodiments, and as shown herein, the one or more outer base engaging mechanisms 518 of the inner base 510 are in the form of a plurality of ribs extending from the outer surface 516 of the sidewall 512. The one or more inner base engaging mechanisms 558 of the outer base 550 then include one or more push tabs disposed within the sidewall 552 of the outer base 550. Each push tab 558 preferably includes a slot 560 formed in the sidewall 552 substantially around the tab 558 to facilitate the deflection of the tab 558 when the sidewall 552 is pushed inward adjacent the tab 558. One or more ribs 562 are then disposed on the interior surface of the tab 558 such that they extend inward into the radial gap 580 area between the outer base 550 and the inner cap. Upon deflection of the tab 558 inward, the one or more ribs 562 are dimensioned and configured to traverse the radial gap 580 and engage the plurality of ribs 518 of the inner cap 510. Thus, to rotate the inner base 510, a user is required to perform a push-in-and-turn child resistant action on at least one of the push tabs 558 of the outer base 550.

To operatively connect the outer base 550 to the inner base 510, and with reference to FIGS. 8 and 11, the inner base 510 preferably includes a rim 540 extending out from and circumferentially around the sidewall 512. The outer base 550 then includes a corresponding rim 570 positioned and configured to extend inward with respect to the interior surface 554 of sidewall 552. In certain embodiments, and particularly in embodiments in which the one or more inner base engaging mechanisms 558 includes a plurality of push tabs, the rim 570 of the outer base 550 may be segmented to avoid extending across the interior surface of the engaging mechanisms 558. With reference to FIG. 11, the rim 570 of the outer base 550 preferably also includes a ramped surface to facilitate assembly. Thus, when the inner base 510 is pushed down into the outer base 550, the rim 540 rides along the ramp of the rim 570 until the rim 540 of the inner base 510 traverses the rim 570 of the outer base 550 to secure the inner base to the outer base.

Figure 12:
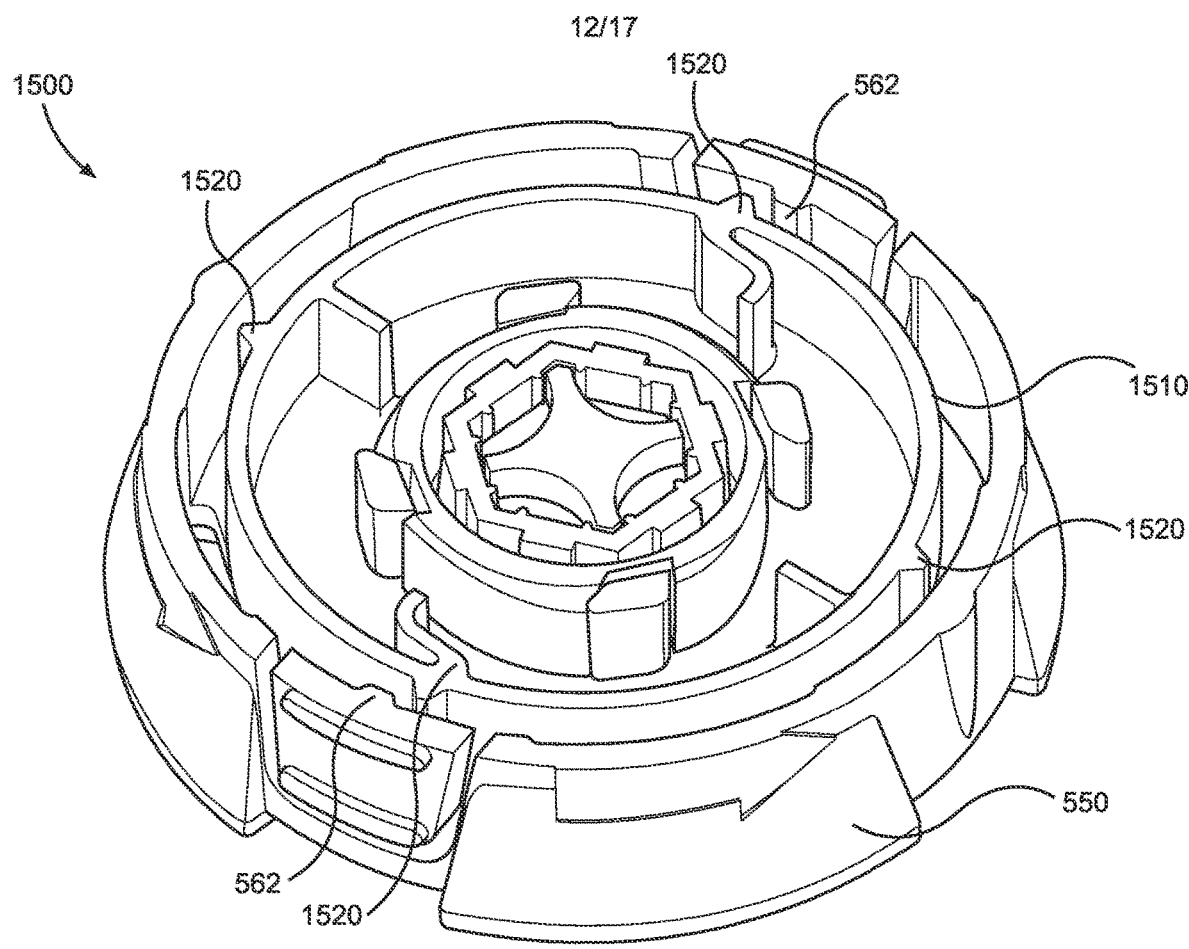
FIG. 12 is an overhead cross-sectional view of the inner base and outer base of the rotatable base system in accordance with an alternate embodiment of the present disclosure.
Figure 13:
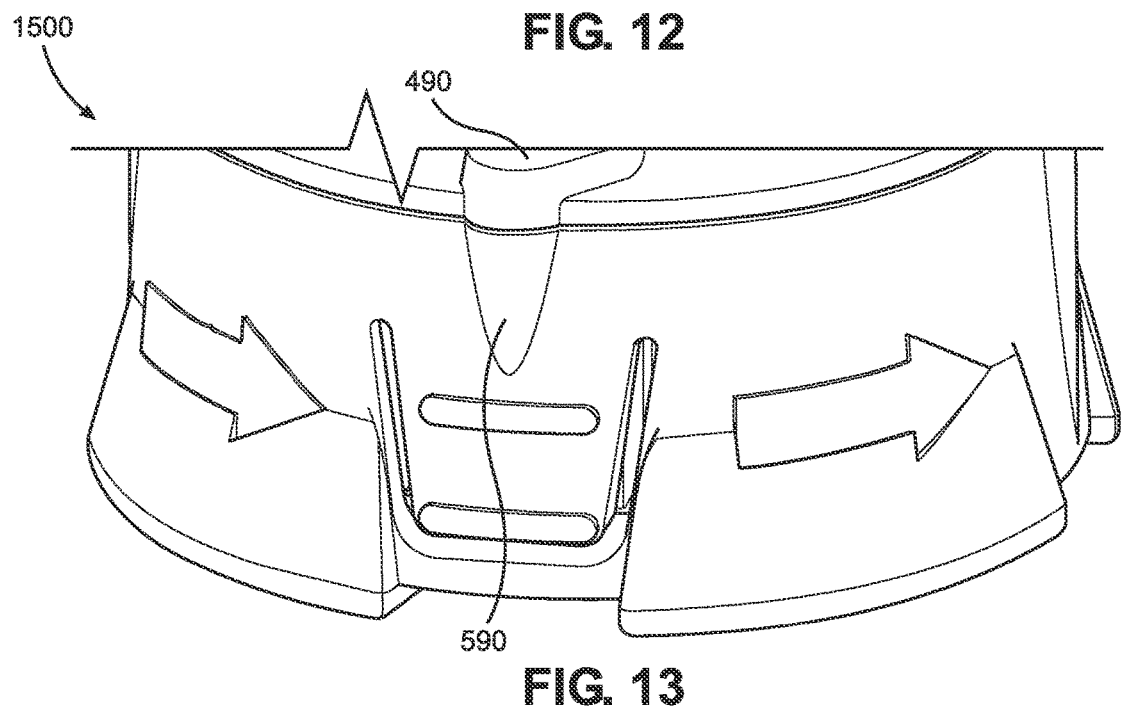
FIG. 13 is a side perspective view of the rotatable base system of FIG. 12 secured to a second end of the container body in accordance with one embodiment of the present disclosure.

According to another aspect of the disclosure, and with reference to FIGS. 12-13, a rotatable base system 1500 including an alternate embodiment of inner base 1510 is depicted with generally the same outer base 550. According to this embodiment, the inner base 1510 includes a smaller plurality of ribs 1520 for engaging the ribs 562 of the outer base 550. The number of ribs 1520 of this embodiment preferably correspond to the number of incremental turns of the outer base 550 being engaged with the inner base 1510 to make a complete rotation of the inner base 1510. More specifically, with respect to the embodiment shown, the inner base 1510 includes four ribs 1520 corresponding to the four ¼ turns required to make a complete rotation of the rotatable base system 1500. As a result, the indexed motion of the inner base 1510 can only be initiated from the outer base 550 when the outer base 550 is pushed in and rotated to the extent needed for the ribs 562 of the of the outer base 550 to engage the corresponding ribs 1520 of the inner base 1510. Referring to FIG. 13, the ribs 1520 are intended to align with the visual guide elements 490, 590 of the container body 400 and outer base 550 when the ribs 590 are positioned to engage the ribs 1520 of the inner base.

Figure 14:
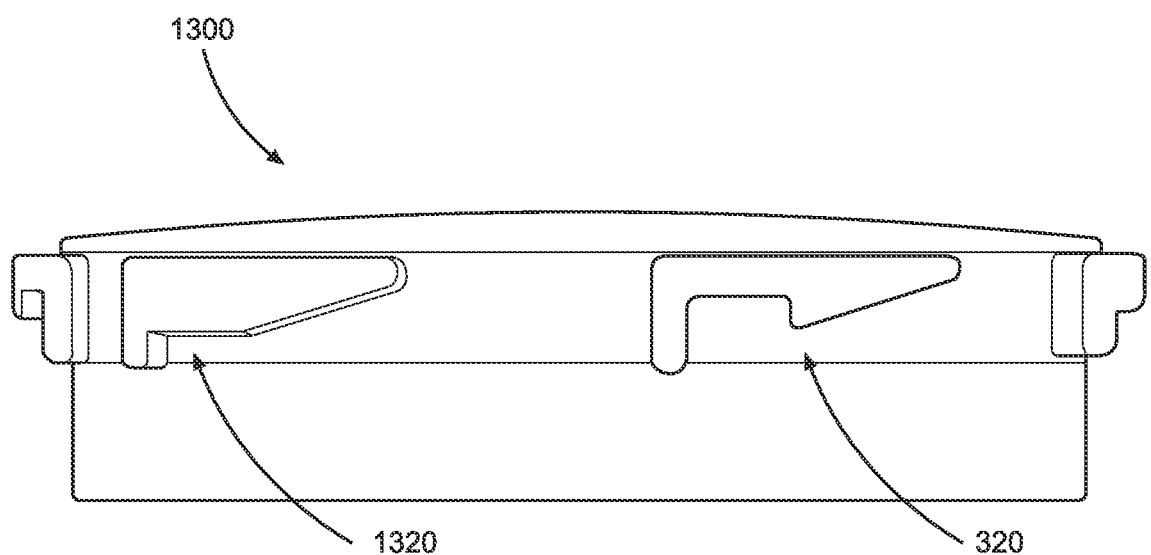
FIG. 14 is a side view of an applicator in accordance with an alternate embodiment of the present disclosure.
Figure 15:
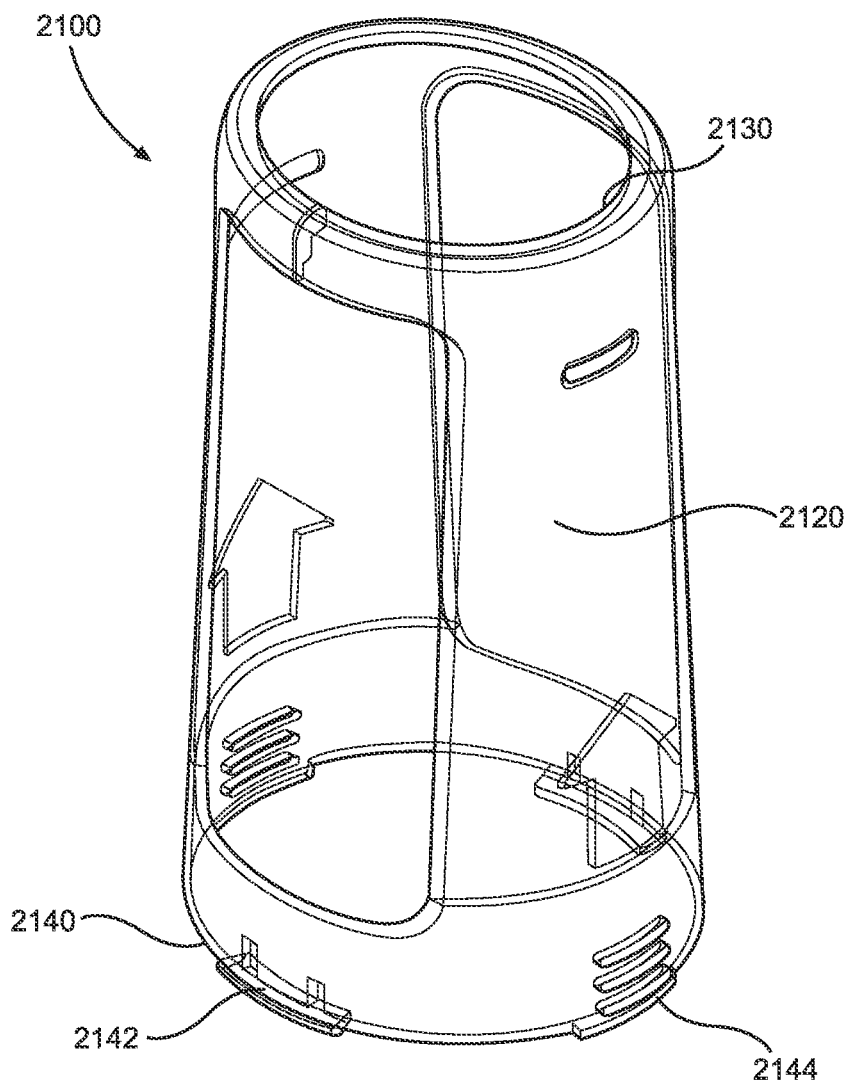
FIG. 15 is a perspective view of a child resistant sleeve for a topical dosing dispenser in accordance with one embodiment of the present disclosure.

According to another aspect of the disclosure, and with reference to FIG. 14, an applicator 1300 is depicted according to an alternate embodiment. In this embodiment, the applicator 1300 includes a first plurality of latch receivers 320 substantially as described above. However, applicator 1300 of this embodiment further includes a second plurality of latch receivers 1320 in which the notch 326 is filled in or otherwise not included. Thus, the cap 200 may be applied to the applicator 1300 as both a child resistant configuration when the locking protrusions 220 engage the first plurality of latch receivers 320 or in a non-child resistant configuration when the locking protrusions 220 engage the second plurality of latch receivers 1320. As should be understood, this provides a child resistant closure system for the dosing dispenser 100 having both a child resistant mode and a non-child resistant mode without requiring different parts or retooling of other components of the dispenser 100. In yet another embodiment, an applicator could also be provided that includes only latch receivers 1320 such that a non-child resistant closure system may be provided for the same dosing dispenser depending on the type of applicator selected to be secured to the container body 400.

According to another embodiment of the disclosure, and with reference to FIGS. 15-18, a child resistant sleeve 2100 is provided for a dosing dispenser 2000. As shown, the sleeve 2100 generally includes a sidewall 2120, a top edge 2130, and an open bottom edge 2140. The open bottom edge 2140 includes a plurality of retention tabs 2142 and a plurality of deflectable push tabs 2144. In certain embodiments, and with reference to FIG. 16, the open bottom edge 2140 may be formed in an oval shape in the undeflected state with the oval shape having a first side 2146a, a second side 2146b, a first end 2148a, and a second end 2148b. The ends 2148a and 2148b are further apart from each other than the first side 2146a is from the second side 2148b. The plurality of retention tabs 2142 extend inward along the first side 2146a and second side 2148b of the open bottom edge 2142.

Figure 16:
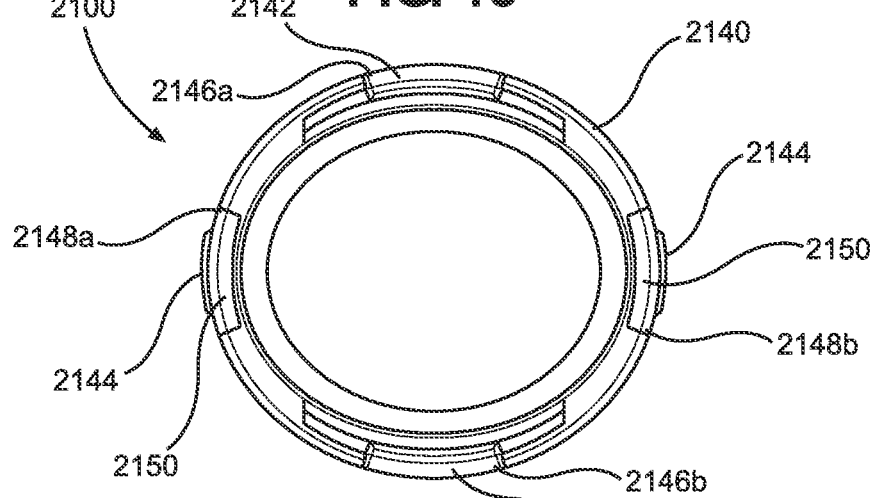
FIG. 16 is a bottom view of the child resistant sleeve of FIG. 15 in accordance with one embodiment of the present disclosure.
Figure 17:
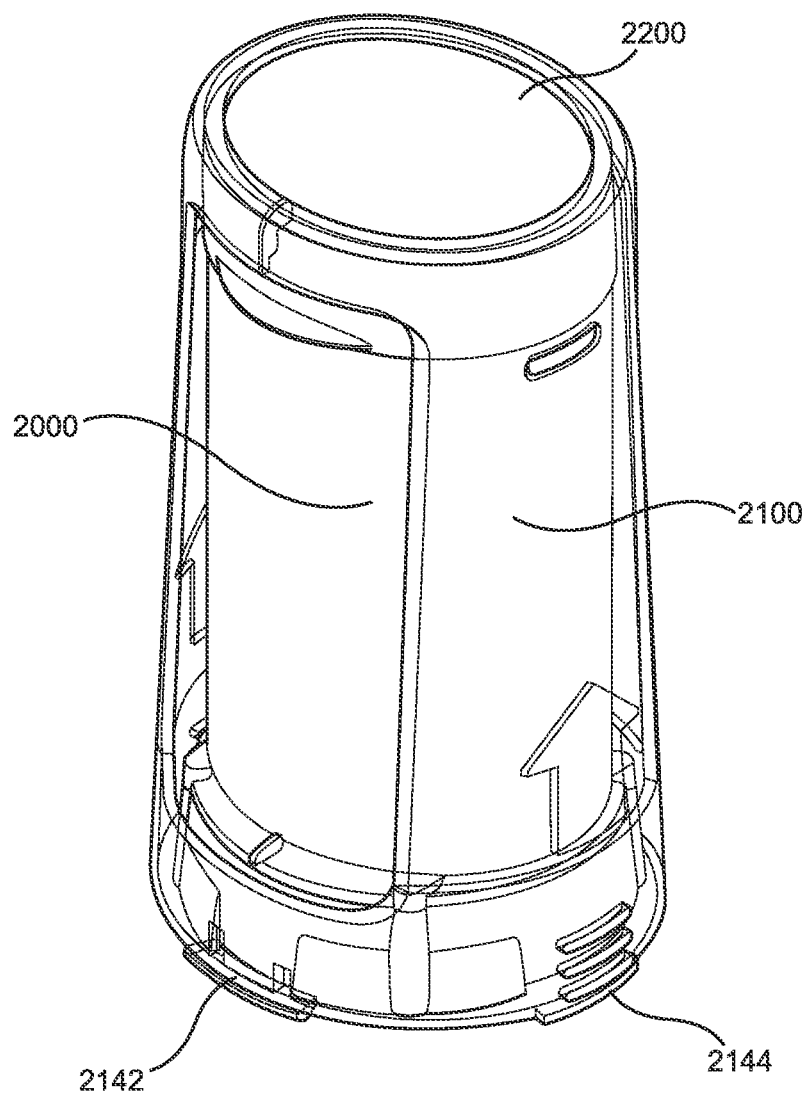
FIG. 17 is a perspective view of the child resistant sleeve of FIG. 15 secured to a topical dosing dispenser in accordance with one embodiment of the present disclosure.
Figure 18:
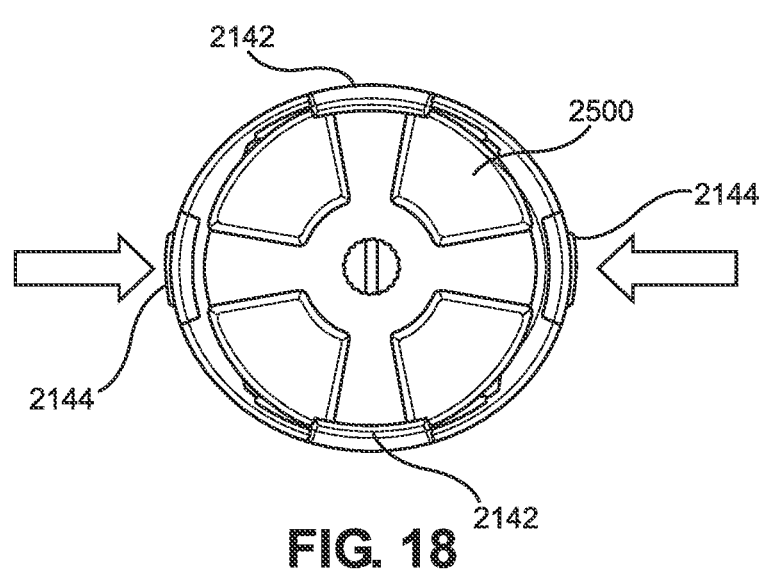
FIG. 18 is a bottom view of the child resistant sleeve and topical dosing dispenser of FIG. 17 in accordance with one embodiment of the present disclosure.

With reference to FIGS. 17-18, the sleeve 2100 is configured to fit over the dosing dispenser 2000 such that the plurality of retention tabs 2142 retain the bottom of the dosing dispenser 2000 within the sleeve 2100 (e.g., bottom of rotatable base system 2500). With the sleeve 2100 positioned over and around the dosing dispenser 200, a user is unable to both remove the cap 2200 from the dosing dispenser 2000 and rotate the rotatable base system 2500. To remove the sleeve 2100, a user pushes in on the deflectable push tabs 2144 such that the plurality of retention tabs 2142 move further apart to disengage from the bottom of the dosing dispenser 2100. With the retention tabs 2142 further apart from each other, the sleeve 2100 may be raised over the dosing dispenser 2000 (or the dosing dispenser 2000 lowered with respect to the sleeve 2100). According to certain embodiments, and as shown in FIGS. 16 and 18, the deflection push tabs 2144 may also include secondary retention tabs 2150 extending inward from the respective ends 2148a and 2148b of the open bottom edge 2140. Thus, according to this embodiment, if the user deflects the push tabs 2144 too far inward, the secondary retention tabs 2150 will engage the bottom of the dosing dispenser 2000 to prevent removal. Accordingly, to enhance the child resistant feature, deflection push tabs 2144 require the user to find an appropriate pressure in order to remove the sleeve 2100.

According to another embodiment of the disclosure, and with reference to FIGS. 19-20, a child resistant sleeve 3100 is disclosed that functions as both a cap 3200 for a corresponding dosing dispenser and for preventing access to the rotatable base system of the dosing dispenser. According to this embodiment, the cap 3200 of the sleeve 3100 includes a deflectable outer ring 3260 that includes a plurality of tabs 3220 positioned and configured to be disposed underneath a container rim of the container body of the dosing dispenser (see FIG. 6 for an exemplary container rim 424 on container body 400) when the sleeve 3100 and cap 3200 is installed with respect to the dosing dispenser. The tabs 3220 positioned underneath the container rim retains the sleeve 3100 and cap 3200 to the dosing dispenser 3000 such that the cap 3200 functions to seal the corresponding dispensing aperture of the applicator. In operation, the deflectable ring 3260 is operable to be pushed inward such that the tabs 3220 positioned on the interior surface of the ring 3260 are pushed outward (similar to the operation of the retention tabs 2142 of the embodiment of FIGS. 15-18 described above). With the tabs 3220 deflected outward, the tabs 3220 are able to traverse the container rim such that the sleeve 3100 and cap 3200 may be removed from the dosing dispenser.

Figure 21:
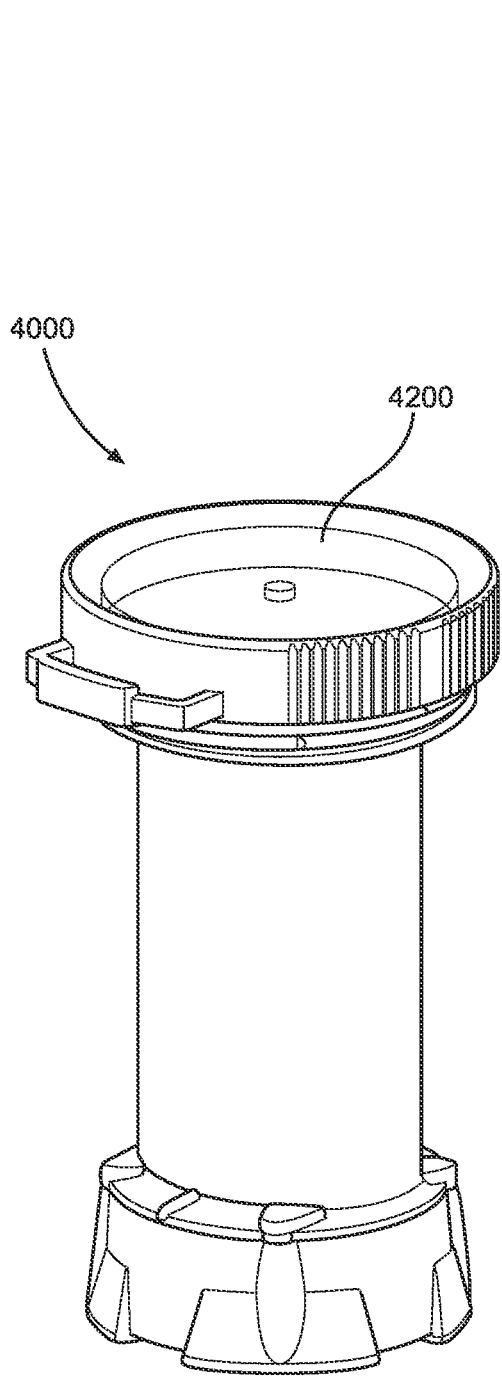
FIG. 21 is a perspective view of a topical dosing dispenser with associated cap in accordance with one embodiment of the present disclosure.
Figure 22:
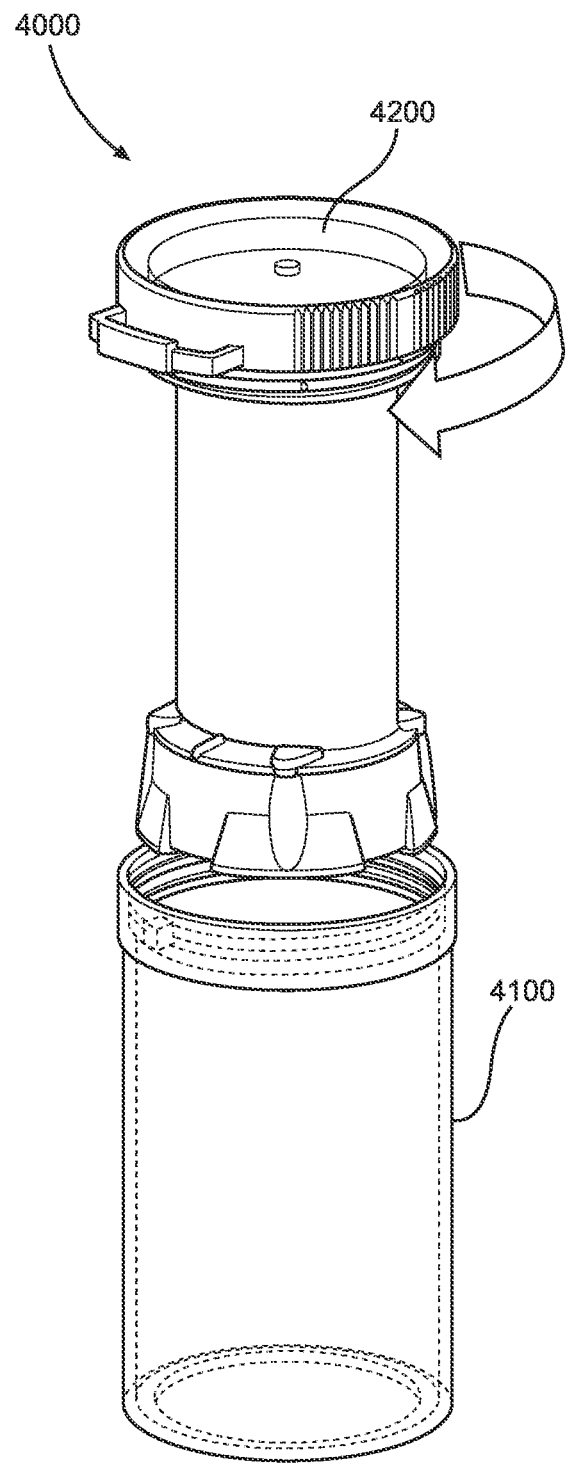
FIG. 22 is a perspective view of the topical dosing dispenser of FIG. 21 and corresponding container in which the dispenser is intended to be placed with cap operable to be secured to the neck of the container in a child resistant configuration.

In yet another embodiment of the disclosure, and with reference to FIGS. 21-22, the dosing dispenser 4000 is configured to be placed into a separate more traditional container 4100. The dosing dispenser includes a cap 4200 configured to be secured to the applicator using a first engagement system. The cap 4200 and container 4100 then include a separate child resistant closure system (with numerous types of applicable child resistant closure systems being known in the prescription pharmaceutical industry) to secure the cap 4200 to the container 4100 in a child resistant configuration with the rest of the dosing dispenser 4000 disposed within container 4100.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A child resistant closure system for a topical dosing dispenser, the closure system comprising:
    an applicator dimensioned and configured to be secured to a first end of a container body, the applicator including:
        a top wall having an aperture for dispensing a flowable composition from the container body, and
        a circumferential sidewall having a plurality of cap engagement mechanisms disposed on an outer surface of the sidewall; and
    a cap dimensioned and configured to be secured to the applicator in a child resistant configuration, the cap including:
        a top wall for covering the aperture of the applicator when the cap is secured to the applicator, and
        a circumferential sidewall having a plurality of applicator engagement mechanisms disposed on an interior surface of the sidewall,
    wherein one or more portions of the cap are operable to be deflected such that each of the plurality of applicator engagement mechanisms are positioned and configured to engage one of the plurality of cap engagement mechanisms in the child resistant configuration when the cap is secured to the applicator and a child-resistant action is required to disengage the plurality of applicator engagement mechanisms from the plurality of cap engagement mechanisms to remove the cap from the applicator.

2. The child resistant closure system of claim 1 wherein the top wall of the cap is operable to be deflected to facilitate and retain engagement of the plurality of applicator engagement mechanisms with the plurality of cap engagement mechanisms.

3. The child resistant closure system of claim 2 wherein the plurality of cap engagement mechanisms of the applicator each include a latch receiver having a notch and wherein each of the plurality of applicator engagement mechanisms are retained within the notches of the latch receivers when the top wall of the cap is deflected upward by the top wall of the applicator when the cap is secured to the applicator in the child resistant configuration.

4. The child resistant closure system of claim 3 wherein the sidewall of the cap is operable to be deflected downward to disengage the plurality of applicator engagement mechanisms from the notches of the plurality of cap engagement mechanisms.

5. The child resistant closure system of claim 4 wherein the applicator includes a dome shape such that an interstice is formed between an outer edge of the top wall of the cap and an outer edge of the top wall of the applicator when the cap is secured to the applicator.

6. The child resistant closure system of claim 5 wherein the sidewall of the cap includes a plurality of arms that are operable to be deflected downward upon a push-down action on the cap to disengage the plurality of applicator engagement mechanisms from the plurality of cap engagement mechanisms.

7. The child resistant closure system of claim 6 wherein each of the plurality of arms include an upper portion that extends at least partially above the top wall of the cap when the cap is secured to the applicator.

8. The child resistant closure system of claim 2 wherein, when the cap is secured to the applicator in the child resistant configuration, the top wall of the applicator and the top wall of the cap are positioned and configured such that the top wall of the applicator exerts an upward force on the top wall of the cap thereby sealing the aperture in the top wall of the applicator.

9. The child resistant closure system of claim 8 wherein an inner surface of the top wall of the cap further includes a sealing protrusion dimensioned and configured to be inserted into the aperture of the applicator when the cap is secured to the applicator.

10. A topical dosing dispenser for a flowable composition, the topical dosing dispenser comprising:
    a container body defining a chamber for housing the flowable composition, the chamber dimensioned and configured to receive a plunger for dispensing the flowable composition from the chamber;
    a child resistant base system including:
        an inner base rotatable relative to the container body, the inner base including a sidewall and one or more outer base engagement mechanisms disposed along an exterior surface of the sidewall of the inner base, and
        an outer base configured to receive and retain the inner base, the outer base including:
            a sidewall disposed around the sidewall of the inner base, the side wall of the outer base positioned and configured to provide a radial gap between the sidewall of the outer base and the sidewall of the inner base, and the sidewall including one or more deflectable portions that are operable to move from an undeflected position to a deflected position, and
            one or more inner base engaging mechanisms disposed adjacent the one or more deflectable portions of the sidewall of the outer base,
    a drive screw having a distal end disposed within the chamber and a proximal end operatively connected to the inner base such that rotation of the inner base rotates the drive screw for moving the plunger within the chamber,
    wherein, when the one or more deflectable portions of the sidewall of the outer base are in the undeflected position, the outer base is configured to rotate independently of the inner base, and
    wherein, when the one or more deflectable portions of the sidewall of the outer base are in the deflected position, the one or more inner base engaging mechanisms of the outer base are dimensioned and configured to traverse the radial gap between the sidewall of the outer base and the sidewall of the inner base to engage the one or more outer base engaging mechanisms of the inner base such that rotation of the outer base further rotates the inner base.

11. The topical dosing dispenser of claim 10 wherein the one or more outer base engagement mechanisms of the inner base includes a plurality of vertical ribs extending radially around the exterior surface of the sidewall of the inner base.

12. The topical dosing dispenser of claim 11 wherein each of the one or more deflectable portions of the sidewall of the outer base includes a deflectable tab formed into the sidewall of the outer base, each of the deflectable tabs including one of the one or more inner base engaging mechanisms for engaging the plurality of vertical ribs of the inner base upon deflection of the deflectable tab.

13. The topical dosing dispenser of claim 10 wherein the outer base includes a rim positioned and configured to extend inward with from an inner surface of the sidewall of the outer base and the inner base includes a corresponding rim positioned and configured to extend outward from the exterior surface of the sidewall of the inner base, and wherein the inner base is dimensioned and configured to be retained within the outer base when the rim of the inner base traverses the rim of the outer base.

14. The topical dosing dispenser of claim 13 wherein the rim of the outer base is segmented with each segment disposed between adjacent deflectable portions of the sidewall of the outer base.

15. The topical dosing dispenser of claim 14 wherein the rim of at least one of the outer base and the inner base includes an angled ramp surface to facilitate traversal of the rim of the inner base past the rim of the outer base.

16. The topical dosing dispenser of claim 10 further comprising:
    an applicator dimensioned and configured to be secured to a first end of a container body, the applicator including:
        a top wall having an aperture for dispensing the flowable composition from the chamber of the container body, and
        a circumferential sidewall having a plurality of cap engagement mechanisms disposed on an outer surface of the sidewall; and
    a cap dimensioned and configured to be secured to the applicator in a child resistant configuration, the cap including:
        a top wall for covering the aperture of the applicator when the cap is secured to the applicator, and
        a circumferential sidewall having a plurality of applicator engagement mechanisms disposed on an interior surface of the sidewall,
    wherein one or more portions of the cap are operable to be deflected such that each of the plurality of applicator engagement mechanisms are positioned and configured to engage one of the plurality of cap engagement mechanisms in the child resistant configuration when the cap is secured to the applicator and a child-resistant action is required to disengage the plurality of applicator engagement mechanisms from the plurality of cap engagement mechanisms to remove the cap from the applicator.

17. The topical dosing dispenser of claim 16 wherein the sidewall of the cap includes a plurality of arms that are operable to be deflected downward upon a push-down action on the cap to disengage the plurality of applicator engagement mechanisms from the plurality of cap engagement mechanisms.

18. A topical dosing dispenser comprising:
    a container body defining a chamber for housing a flowable composition, the container body including a first end and a second end;
    a child resistant closure system configured to be operatively secured to the first end of the container body, the child resistant closure system including an applicator and a cap with the cap configured to be secured to the applicator in a child resistant configuration such that a child resistant action is required to remove the cap from the applicator; and
    a child resistant rotatable base system configured to be operatively secured to the second end of the container body, the child resistant rotatable base system including an inner base and an outer base configured to be retained within the inner base such that a child resistant action is required to rotate the inner base using the outer base, wherein rotation of the inner base is operable to rotate a drive screw having a proximal end operatively connected to the inner base and a distal end disposed within the chamber of the container body.

19. The topical dosing dispenser of claim 18 wherein the child resistant base system includes:

an inner base rotatable relative to the container body, the inner base including a sidewall and one or more outer base engagement mechanisms disposed along an exterior surface of the sidewall of the inner base, and an outer base configured to receive and retain the inner base, the outer base including:

a sidewall disposed around the sidewall of the inner base, the side wall of the outer base positioned and configured to provide a radial gap between the sidewall of the outer base and the sidewall of the inner base, and the sidewall including one or more deflectable portions that are operable to move from an undeflected position to a deflected position, and one or more inner base engaging mechanisms disposed adjacent the one or more deflectable portions of the sidewall of the outer base, wherein the inner base is configured to receive the proximal end of the drive screw, wherein, when the one or more deflectable portions of the sidewall of the outer base are in the undeflected position, the outer base is configured to rotate independently of the inner base, and wherein, when the one or more deflectable portions of the sidewall of the outer base are in the deflected position, the one or more inner base engaging mechanisms of the outer base are dimensioned and configured to traverse the radial gap between the sidewall of the outer base and the sidewall of the inner base to engage the one or more outer base engaging mechanisms of the inner base such that rotation of the outer base further rotates the inner base.

* * * * *